(12) United States Patent
Adachi

(10) Patent No.: US 7,340,341 B2
(45) Date of Patent: Mar. 4, 2008

(54) DIGITAL MAP POSITION INFORMATION COMPRESSING METHOD AND DEVICE

(75) Inventor: Shinya Adachi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 25 days.

(21) Appl. No.: 10/560,064

(22) PCT Filed: Jun. 11, 2004

(86) PCT No.: PCT/JP2004/008579

§ 371 (c)(1),
(2), (4) Date: Dec. 8, 2005

(87) PCT Pub. No.: WO2004/111975

PCT Pub. Date: Dec. 23, 2004

(65) Prior Publication Data

US 2006/0155463 A1    Jul. 13, 2006

(30) Foreign Application Priority Data

Jun. 11, 2003 (JP) .............................. 2003-166503
Jun. 12, 2003 (JP) .............................. 2003-167780

(51) Int. Cl.
*G01C 21/30* (2006.01)

(52) U.S. Cl. .................... 701/208; 701/207; 340/988; 340/995.12; 340/995.17; 340/995.22

(58) Field of Classification Search .................. 701/200, 701/207, 208, 212; 340/988, 995.12, 995.17, 340/995.22
See application file for complete search history.

(56) References Cited

U.S. PATENT DOCUMENTS 6,169,552 B1    1/2001  Endo et al.
6,314,369 B1 *  11/2001 Ito et al. ..................... 701/209
6,931,319 B2 *  8/2005  Adachi ....................... 701/208

FOREIGN PATENT DOCUMENTS

| JP | 4-141789 | 5/1992 |
|---|---|---|
| JP | 6-52288 | 2/1994 |
| JP | 2003/23357 | 1/2003 |

* cited by examiner

Primary Examiner—Gertrude A. Jeanglaude
(74) Attorney, Agent, or Firm—Pearne & Gordon LLP

(57) ABSTRACT

The present invention provides a method and apparatus for compressing data of position information such as a road on a digital map in order to realize an accurate transmission of the position information in a small volume of data. A shape vector of an object road segment is resampled, and as this occurs, a sampling point is represented by quantized angle information. By selecting preferably the sampling point and an angle resolution of the quantized angle information, an error in position information can be reduced. For example, in a method for compressing position information by setting appropriately an angle resolution δ which constitutes a quantization unit of an angle, the angle resolution is set according the length of a resampling length L which regulates an interval of resampling, a road shape contained in a digital map is divided into one or a plurality of segments, road shapes in the segments are resampled by a constant resampling length L, and the position of the road shapes is represented by a data string of quantized angle information indicating the position of a sampling point, and data of the data string are variable length coded for transmission. By making the angle resolution δ and the resampling length L interlock with each other, the angle resolution is made small when the resampling length is long, whereas when the resampling length is short, the angle resolution is increased, whereby position information such as road can be transmitted accurately in a small volume of data.

25 Claims, 33 Drawing Sheets

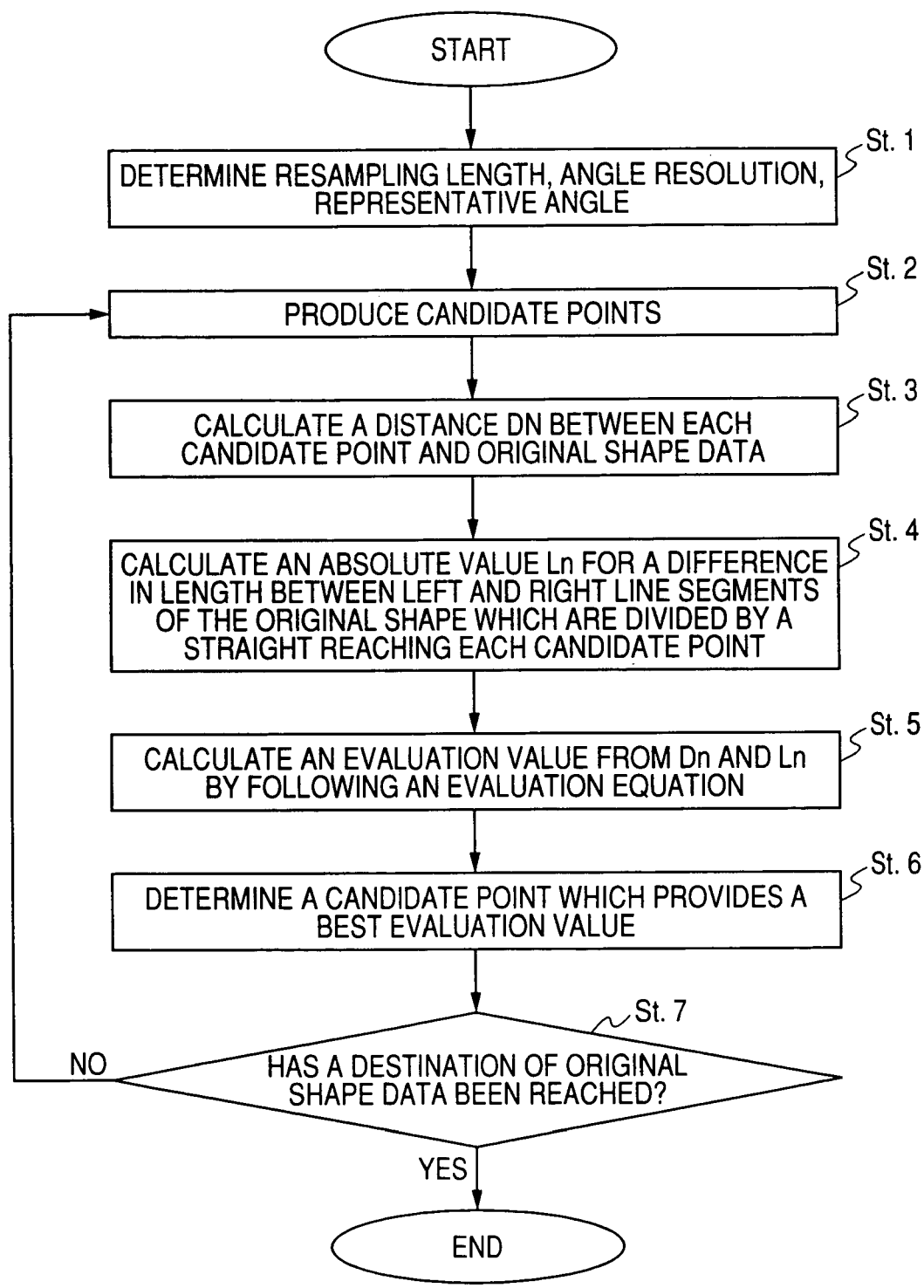

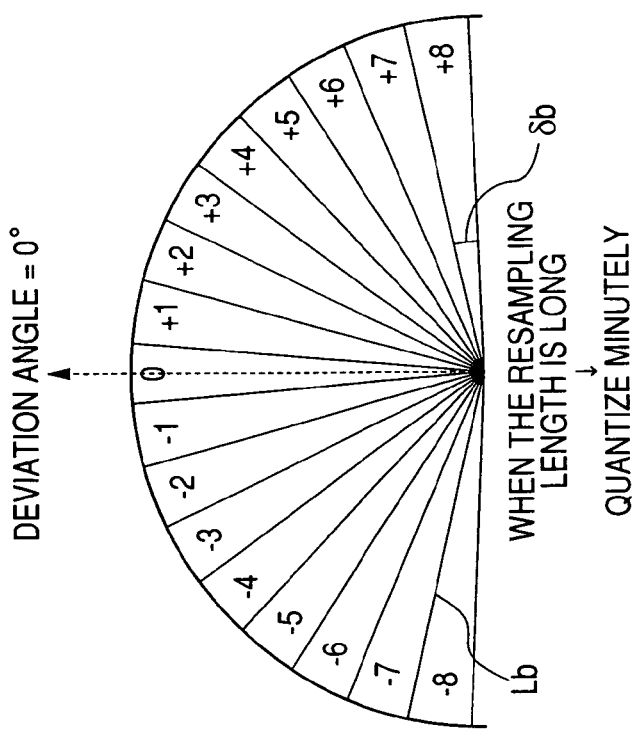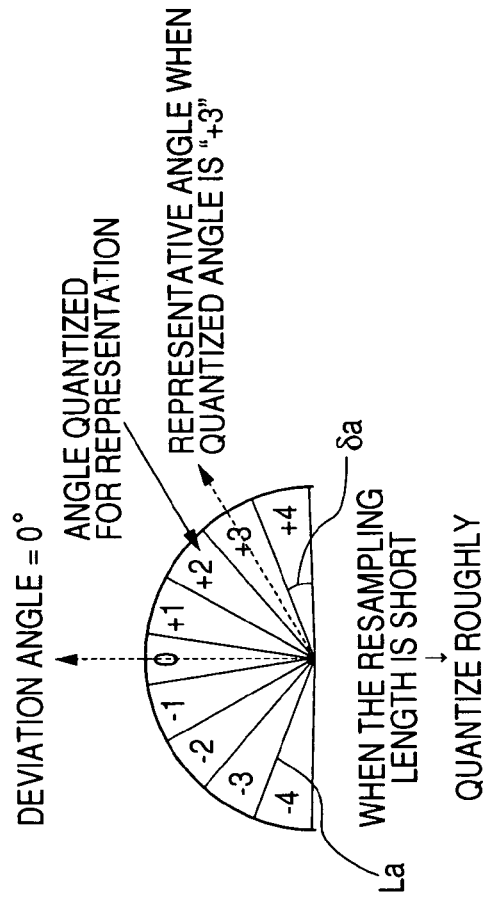

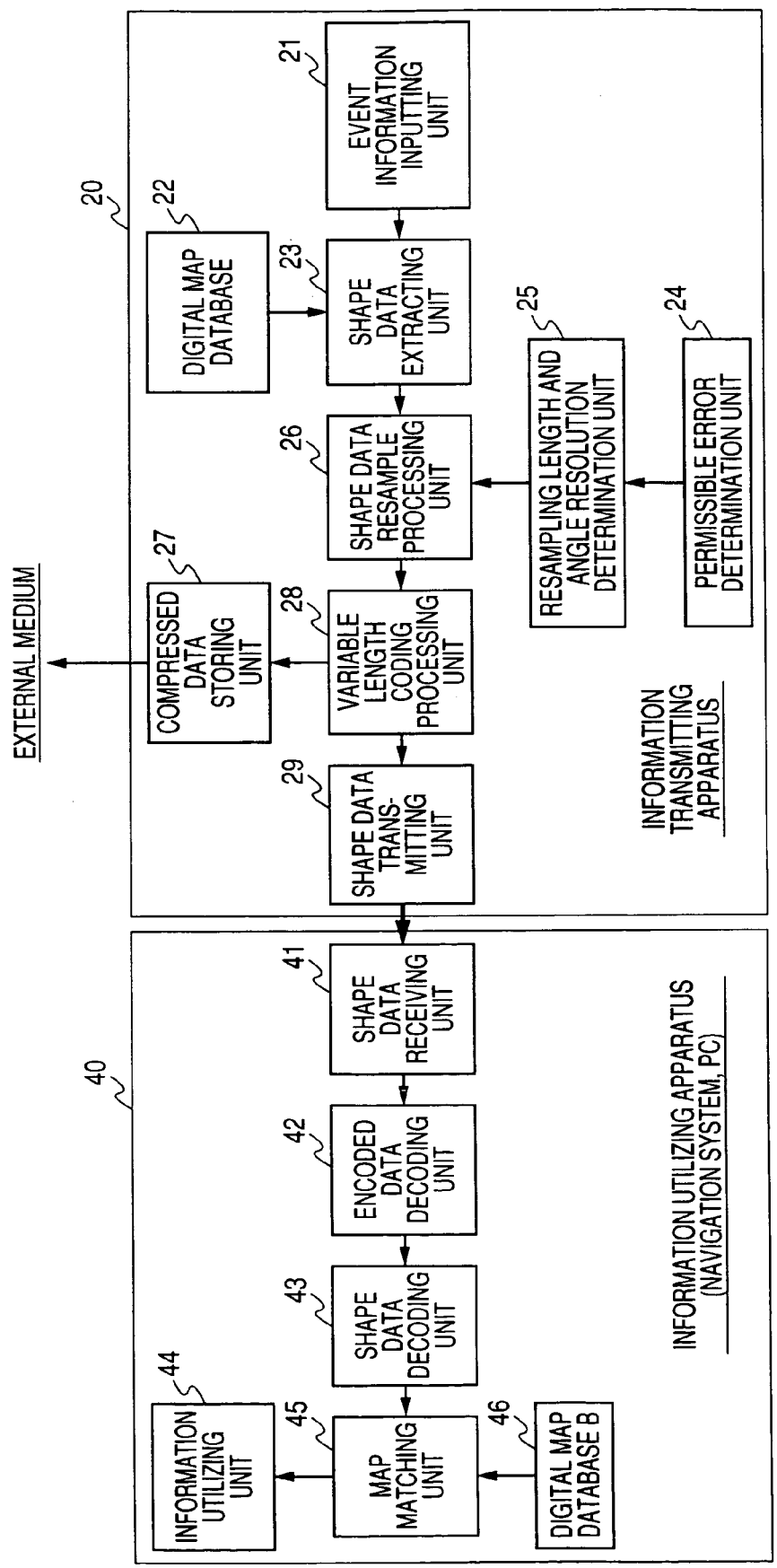

| RESAMPLING LENGTH (m) | ANGLE RESOLUTION (°) δ |
|---|---|
| 10 | 6 |
| 20 | 4 |
| 40 | 3 |
| 80 | 2 |
| 160 | 2 |
| 320 | 1 |
| 640 | 1 |
| 1280 | 0.5 |

FIG. 20

| L(m) | DISTANCE ERROR Ea(m) | | |
|---|---|---|---|
| | δ = 1° | δ = 3° | δ = 6° |
| 10 | 0.09 | 0.26 | 0.52 |
| 20 | 0.17 | 0.52 | 1.05 |
| 40 | 0.35 | 1.05 | 2.09 |
| 80 | 0.70 | 2.09 | 4.19 |
| 160 | 1.40 | 4.19 | 8.37 |
| 320 | 2.79 | 8.38 | 16.75 |
| 640 | 5.58 | 16.75 | 33.50 |
| 1280 | 11.17 | 33.51 | 66.99 |

A ROAD IN A MOUNTAINOUS AREA WHOSE RESAMPLING LENGTH IS SHORT
δ = 2
Kr = 0.4

A ROAD IN A MOUNTAINOUS AREA WHOSE RESAMPLING LENGTH IS SHORT
δ = 6
Kr = 0.4

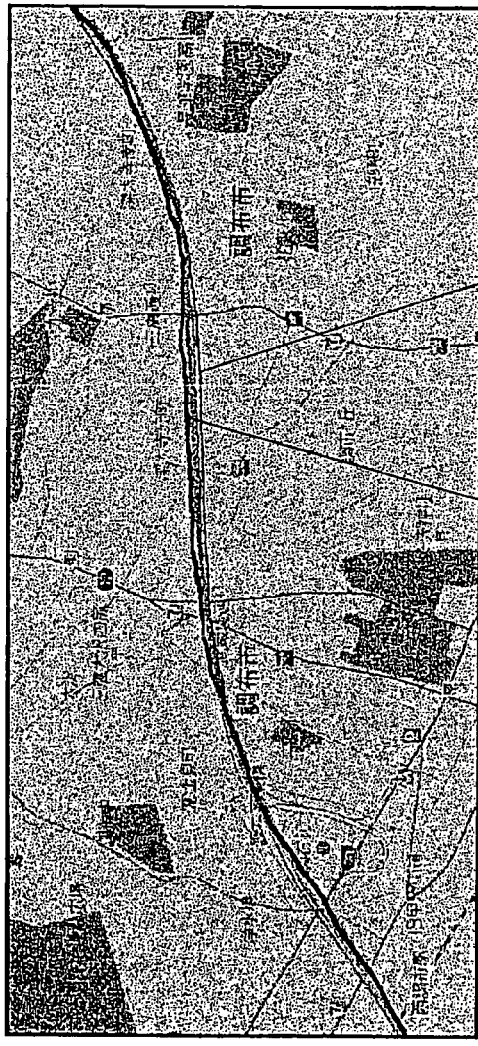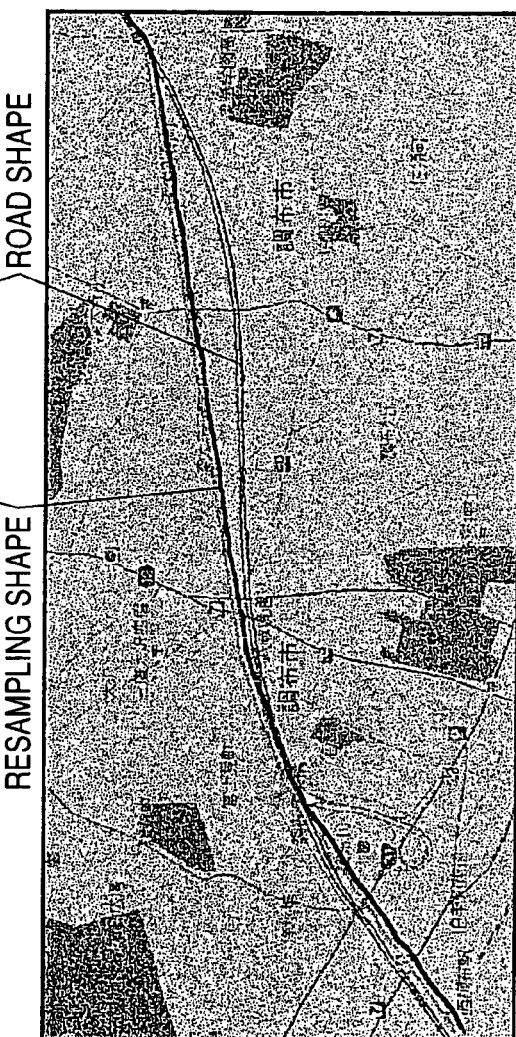
FIG. 25(a) A HIGHWAY WHOSE RESAMPLING LENGTH IS LONG
δ = 2
Kr = 0.4
FIG. 25(b) A HIGHWAY WHOSE RESAMPLING LENGTH IS LONG
δ = 6
Kr = 0.4

FIG. 26
|  | δ = 2° | δ = 6° |
|---|---|---|
| • A ROAD IN A MOUNTAINOUS AREA | 1042bit | 790bit |
| • A HIGHWAY | 182bit | 88bit |
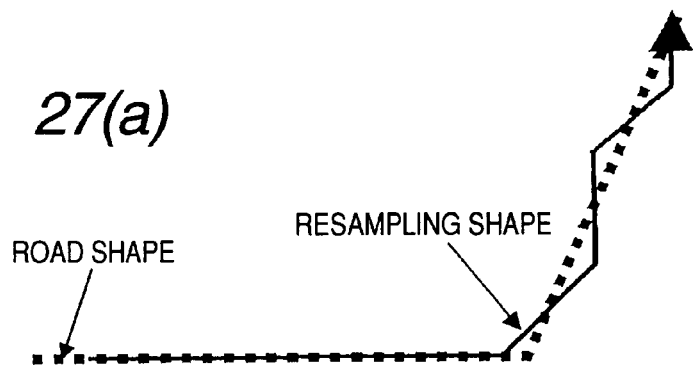
FIG. 27(a)
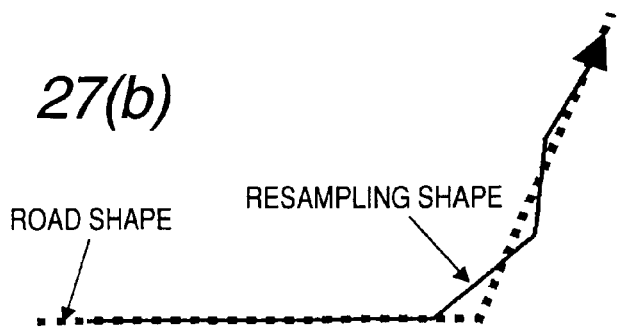
FIG. 27(b)

| RESAMPLING LENGTH (m) | ANGLE RESOLUTION (°) \|θ\| ≤ 10 | ANGLE RESOLUTION (°) 10 < \|θ\| ≤ 60 | ANGLE RESOLUTION (°) 60 < \|θ\| |
|---|---|---|---|
| 10 | 6 | 10 | 30 |
| 20 | 4 | 6 | 20 |
| 40 | 3 | 6 | 10 |
| 80 | 2 | 4 | 4 |
| 160 | 2 | 2 | 4 |
| 320 | 1 | 1 | 2 |
| 640 | 1 | 1 | 2 |
| 1280 | 0.5 | 0.5 | 1 |

LOCUS DATA ARE RESAMPLED
BY AN EQUAL DISTANCE L

ANGLE COMPONENTS ARE
REPRESENTED BY DEVIATION ANGLES

DEVIATION ANGLES ARE
REPRESENTED BY STATISTICALLY
ESTIMATED DIFFERENCE VALUES

FIG. 35

| SPECIAL CODES | | CODES | ADDITIONAL BITS | |
|---|---|---|---|---|
| EOD CODES | | 1100 | 0 | |
| INPUT VALUES | | CODES | ADDITIONAL BITS | RANGES (°) OF Δθ VALUES |
| RUN LENGTHS | VALUES OF Δθ (°) | | | |
| 0 | 0 | 0 | 0 | -1~+1 |
| 5 | 0 | 100 | 0 | " |
| 10 | 0 | 1101 | 0 | " |
| 0 | ±3 | 1110 | 1 (± IDENTIFICATION) | ±2~4 |
| 0 | ±6 | 111100 | 1 (± IDENTIFICATION) | ±5~7 |
| 0 | ±9 | 111101 | 1 (± IDENTIFICATION) | ±8~10 |
| ⟩ | | | | | ved

DIGITAL MAP POSITION INFORMATION COMPRESSING METHOD AND DEVICE

TECHNICAL FIELD

The present invention relates to a method for compressing data of position information such roads on a digital map and an apparatus for implementing the method, and more particularly to a method and apparatus for transmitting a position accurately in a small volume of data.

BACKGROUND ART

Conventionally, in VICS (a road traffic information communication system), there has been a service of providing road traffic information indicating road segments where traffic jams are occurring or traveling time to vehicular navigation systems which have digital map databases installed therein through FM multiplex broadcasting or beacons. The vehicular navigation system receives the road traffic information to display a colored traffic-jam occurring road segment on a map displayed on the screen or to calculate a required time to a goal point for display.

Thus, when road traffic information is provided, the position information on a road on the digital map needs to be transmitted. In addition, also in a service of providing information on a recommended route which makes it possible to reach a goal point in a shortest time by receiving information on the current point and the goal point or a road traffic information collecting system for which researches have been being made in recent years and in which locus information and speed information are collected from running vehicles (probe cars), the recommended route on the digital map and the traveling path need to be transmitted accurately to a receiving side.

Heretofore, when attempting to transmit road positions on digital maps, link numbers assigned to roads or node numbers which specify nodes such as intersections are used. However, node numbers and link numbers defined for the road network need to be renumbered with new numbers as new roads are built or the existing roads are rerouted, and since digital map data produced by respective map manufacturers also need to be renewed in association with the renumbering of link numbers and node numbers, the methods using the node numbers and link numbers require tremendous social costs for maintenance.

With a view to improving these points, the following patent document No. 1 (JP-A-2003-23357) proposes a method for transmitting a road segment on a digital map without using node numbers and link numbers and in a small volume of data.

In this method, sampling points are reset on a road segment that is attempted to be transmitted at intervals of a constant distance (this being referred to as an equidistance resampling) on a road segment to be transmitted, a compression coding process is applied to a data string in which position data of the respective sampling points are arranged sequentially, and compression encoded data are transmitted. On a receiving side which receives the compression encoded data restores the data string of the position data of the sampling points and implements a map matching of the position data with its own digital map data so as to identify the road segment.

Alternatively, the receiving side decodes the position data of the sampling points and displays a resampling shape in which the sampling points are linked to each other on its own digital map, or, in order to identify the transmitted road segment accurately, implements a map matching of the position data of the sampling points with its own digital map data so as to identify the object road on its digital map data.

The compression encoding of the data string of position data is implemented sequentially as follows: (1) Conversion of position data into single variable; (2) Conversion of a value represented by a single variable into a statistically biased value; and (3) Variable length coding of the converted value.

(1) Conversion of Position Data into Single Variable

FIG. 34A shows sampling points set along the road segment by the equidistant resampling as PJ−1, PJ. The sampling point (PJ) can uniquely be identified in two dimensions of a distance L from the adjacent sampling point (PJ−1) and an angular component Θ, and assuming that the distance is constant (L), the sampling point (PJ) can be represented by one variable of only the angular component Θ from the adjacent sampling point (PJ−1). In FIG. 34A, as this angle Θ, an angle Θ is shown which is represented by an absolute orientation which designates the magnitude in a range of 0 to 360 degrees measured clockwise from the orientation of true north (top on the map) which is regarded as 0 degree. Assuming that the x-y coordinates (latitude, longitude) of PJ−1 and PJ are (xj−1, yj−1) and (xj, yj), respectively, this angle Θj−1 can be calculated from the following equation:

$$\Theta j-1 = \tan-1\{(xj-xj-1)/(yj-yj-1)\}$$

Consequently, the road segment can be represented by a data string of angular components of the respective sampling points by designating the constant distance L between the sampling points and latitude and longitude of the sampling point (reference point) which constitutes an origin or a destination separately.

(2) Conversion of Single Variable Value into Statistically Biased Value

In order for a single variable value of each sampling point to become a statistically biased value which is suitable for variable length coding, as shown in FIG. 34B, the angular component of each sampling point is represented by a displacement difference from the angular component of the adjacent sampling point, that is, a deviation angle Θj. This deviation angle Θj is calculated as:

$$\Theta j = \Theta j - \Theta j-1$$

In the event that the road is rectilinear, the deviation angle of each sampling point focuses on the vicinity of 0 and becomes statistically biased data.

In addition, as shown in FIG. 34C, the angular component of the sampling point can be converted into statistically biased data by representing the deviation angle θj of the sampling point PJ, to which attention is to be paid, by a difference value (deviation angle estimated difference value) Δθj from a deviation angle estimated value Sj (statistically estimated value) of the sampling point PJ which is estimated using deviation angles θj−1, θj−2, . . . of the previous sampling points PJ−1, PJ−2, . . . . The statistically estimated value Sj can be defined as, for example:

$$Sj = \theta j-1; \text{ or}$$

$$Sj = (\theta j-1 + \theta j-2)/2$$

In addition, Sj may be defined in terms of a weighted average of deviation angles at the n previous sampling points. The deviation angle estimated difference value Δθj is calculated as:

$\Delta\theta j = \theta j - Sj$

In the event that the road curves at a constant curvature, a deviation angle estimated difference value Δθ of each sampling point focuses on the vicinity of 0 and becomes statistically biased data.

FIG. 34D is a graph illustrating frequency at which data are generated when a rectilinear road segment is represented by the deviation angle θ and when the curved road segment is represented by the deviation angle estimated difference value Δθ. The generation frequency of θ and Δθ becomes maximum when θ=0° and is statistically biased.

(3) Variable Length Coding

Next, the value of the data string which is converted into the statistically biased value is variable length coded. While the variable length coding method includes many types of methods such as fixed numerical value compression method (0 compression or the like), Shannon-Fanno coding method, Huffman coding method, arithmetic coding method and lexicographic coding method, and any method may be usede.

Here a case will be described in which Huffman coding method, which is the commonest, is used.

In this variable length coding, more frequently generated data are coded by bits in a smaller number and less frequently generated data are coded by bits in a greater number, so that the total data volume is reduced. A relationship between the data and codes are defined in a code table.

Now, assume that the arrangement of Δθs at sampling points along the recommended route which are represented in a unit of 1° is as follows:

"0_0_−2_0_0_+1_0_0_−1_0_+5_0_0_0_+1_0"

A case will be described where a code table shown in FIG. 35 in which variable length coding and run length coding are combined is used in order to code the data string. In this code table, a minimum angular resolution (δ) is set to 3°, and the code table regulates such that Δθ which is in the range of −1° to +1° is regarded as 0° and is then represented by a code 0, in a case where 0° occurs continuously five times, it is represented by a code 100, and in a case where 0° occurs continuously ten times, it is represented by a code 1101. In addition, Δθ which is in the range of +/−2° to 4° is regarded as +/−3° and when it is positive, Δθ is then represented by adding an additional bit 0 to a code 1110, whereas when it is negative, Δθ is then represented by adding an additional bit 1 to the code 1110, Δθ which is in the range of +/−5° to 7° is regarded as +/−6° and is then represented by adding an additional bit denoting positive or negative to a code 111100, and Δθ which is in the range of +/−8° to 10° is regarded as +/−9° and is then represented by adding an additional bit denoting positive or negative to a code 111101.

Due to this, the data string is coded as follows:
"0_0_11101_100_0_0_1111000_100"→"0011101100001111000100"

The receiving side which has received the data restores the data string of Δθs using the same code table as that used in coding and reproduces the position data of the sampling points by implementing an opposite process to that implemented on a transmitting side.

Thus, the volume of data to be transmitted can be reduced by coding the same.

In addition, the patent document No. 1 proposes that the constant distance L in the equidistance resampling be set by paying attention to the magnitude of the curvature of the shape of a road. Namely, when performing the resampling on an object road which has a large curvature and hence is curved or in a mountainous area where there are many such roads, the distance L in the equidistance resampling is set short, whereas when performing the resampling on an object road which has a small curvature and hence is rectilinear or in an urban area where there are many such roads, the distance L is set longer. This is because in the event that the resampling is performed on a road which is largely curved using the distance which is long, sampling points cannot be disposed at positions indicating the characteristic shape of the road, whereby the occurrence of erroneous matching on the receiving side becomes highly possible.

In the conventional resampling method, however, since sampling points are set such that the distance error from the shape of a road (original shape data) that is to be transmitted becomes as small as possible, as shown FIGS. 15A, 15B, when original shape data (dotted lines) curves clockwise or counterclockwise, resampling shapes (solid lines) which link sampling points take shapes which are positioned slightly close to the centers of the curves. The dissociation between the resampling shape and the original shape is increased as the resampling length becomes longer. Due to this, when attempting to reduce the dissociation, the resampling length has to be set shorter, however, in the event that the attempt is actually done, the volume of data to be transmitted is increased. Moreover, even in the event that the resampling distance is set as short as possible, it is theoretically not possible to eliminate the dissociation completely.

Furthermore, in order to transmit the shape of a road on the digital map, in a case where angle components indicating the positions of sampling points are represented by angle resolutions δ (namely, quantized in a unit of δ) and are compression coded for transmission, the following problems exist.

① The data volume of the angle component can be reduced by setting a large angle resolution δ (namely, by setting a large quantization unit). In the above explanation, while δ=3° is illustrated as an example, in case δ=6°, the data volume can further be reduced. In the event that a large angle resolution δ is set, however, the quantization error becomes larger, the occurrence of erroneous matching on the receiving side becomes highly possible.

For example, as shown in FIG. 36, when a point PJ is resampled at a position which is a distance L away from a point PJ−1, assuming that the angle resolution is δ, an angle between a first candidate point P'J for the point PJ and a second candidate point P"J therefor, which is adjacent, becomes δ. Of these, since the candidate point P'J which is closer to the road shape is selected as a sampling point, a distance Ea (namely, an error) between the sampling point and the road shape is expressed as:

Maximum value of Error $Ea \approx L \times |\sin(\delta/2)|$

The greater the angle resolution δ becomes, the greater the error Ea becomes, and the occurrence of erroneous matching on the receiving side becomes highly possible.

Due to this, it is required that the resampling is carried out such that the data volume becomes small and the error from the road shape also becomes small.

② When the angle component indicating the position of a sampling point is quantized in a unit δ, as shown in FIG. 37, in the event that a sampling point PJ deviates from a rectilinear road for some reason, the next sampling point PJ+1 attempts to compensate for the deviation from the shape of the road in the unit δ and is, as a result, resampled in a state in which it deviates from the road to an opposite side, and this is repeated, whereby there is resulting from the resampling a phenomenon in which the sampling points are disposed in a zigzag fashion.

This zigzag phenomenon prevents the accurate transmission of the road shape to the receiving side and reduces the compression coefficient of data.

③ When the shape of a road is represented by the deviation angles of sampling points or deviation angle estimated difference values for transmission, in the event that the deviation angles indicating the positions of the sampling points or deviation angle estimated difference values are quantized after the rectilinear shape of the road has been resampled, since an error produced by the quantization has an effect on later orientations, there may occur a case where a shape that is reproduced on the receiving side largely deviates from the original shape.

DISCLOSURE OF THE INVENTION

The invention was made to solve these problems and an object thereof is to provide a method for compressing positional information on a digital map which can produce compressed data which are data representing positional information such as a road on the digital map and which can accurately reproduce an original shape in a small volume of data.

Then, in a vector data compressing method according to the invention, a vector shape is resampled in a constant resampling length so as to set sampling points so that a distance error between a straight line which links between the sampling points and the vector shape does not deviate to either the left side or the right side of the straight line as viewed in a longitudinal direction thereof, the vector shape is represented by a data string of angle information indicating the positions of the sampling points, and data of the data string are variable length coded.

On a receiving side to which the compressed data are transmitted, a shape can be reproduced which most approximates to the original shape of the vector. In addition, a longer resampling length can be taken without exceeding a permissible error that has been determined in advance, thereby making it possible to enhance the compression coefficient of the transmitted data.

In addition, according to the invention, there is provided an information providing apparatus which includes a shape data extracting means for extracting road shape data of an object road from a digital map database, a shape data resample processing means for resampling the road shape data in a constant resampling length so as to set sampling point so that a distance error between a straight line which links between the sampling points and the road shape data does not deviate to either the left side or the right side of the straight line and representing the object road by a data string of quantized angle information which indicates the positions of the sampling points, a variable length coding means for variable length coding data of the data string, and a providing means for providing the data variable length coded by the variable length coding means.

This information providing apparatus can compress information on the object road of traffic information or a route to a goal point using the vector data compressing method of the invention for provision.

In addition, according to the invention, there is provided a probe car on-board apparatus which includes an own vehicle position detecting means for detecting the position of an own vehicle, a storing means for storing sequentially, as a traveling path, positions of the own vehicle which are detected by the own vehicle position detecting means, a traveling path resample processing means for resampling a traveling path in a constant resampling length so as to set sampling point so that a distance error between a straight line which links between the sampling points and the traveling path does not deviate to either the left side or the right side of the straight line and representing the traveling path by a data string of quantized angle information which indicates the positions of the sampling points, a variable length coding means for variable length coding data of the data string, and a transmitting means for transmitting the data variable length coded by the variable length coding means.

This probe car on-board apparatus can compress the traveling path using the vector compressing method of the invention for transmission to a probe information collecting center.

In addition, in a method for compressing positional information on a digital map, an angle resolution, which becomes a quantization unit of angle is set in accordance with a resampling length which regulates an interval of resampling, a linear shape contained in the digital map is divided into one or a plurality of segments, linear shapes in the segments are resampled in a constant resampling length so that the positions of the linear shapes are represented by a data string of quantized angle information which indicates the positions of sampling points, and data of the data string is variable length coded.

Thus, the angle resolution and the resampling length are caused to interlock with each other, so that in the event that the resampling length is long, the angle resolution is reduced, whereas in the event that the resampling length is short, the resampling length is increased, whereby positional information such as a road can transmitted accurately in a small volume of data.

In addition, in the invention, the magnitude of the angle resolution is changed depending on the magnitude of the absolute value of a deviation angle, and the angle resolution is set small when the absolute value of the deviation angle is small.

Thus, the zigzag phenomenon can be suppressed.

Additionally, in the invention, when resampling the linear shape, a plurality of candidate points are set at positions which are a distance equal to the resampling length away from an adjacent sampling point in each direction that the quantized angle can take, and a candidate point among the candidate points so set which is closest to the linear shape is set as a sampling point.

By doing this, it is possible to avoid a state in which an error that is produced by the quantization has an effect on later orientations, whereby a reproduced shape can be prevented from being caused to largely deviate from the original shape.

In addition, in the invention, there is provided an information providing apparatus which includes an angle resolution determination means for setting an angle resolution which constitutes a quantization unit of angle depending on intervals of resampling which regulates the length of resampling length, a shape data resample processing means for producing a data string of quantized angle information indicating the positions of sampling points by dividing the road shape of an object road which is contained in a digital map into one or a plurality of segments and resampling road shapes in the segments using a constant resampling length and an angle resolution set depending on the length of the resampling length, and a variable length coding means for variable length coding data of the data string, whereby data that are coded by the variable length coding means are provided as the positional information of the object road.

This information providing apparatus can compress information for provision data such as information on an object road for traffic information or a route to a goal point using the digital map positional information compressing method.

In addition, in the invention, there is provided a probe car on-board apparatus which includes an own vehicle position determination means for detecting the position of an own vehicle, a storing means for storing a traveling path, a resampling length and angle resolution determination means for determining a resampling length which regulates intervals of resampling based on the shape of a traveling path or information from a sensor installed on a vehicle and determining an angle resolution which constitutes a quantization unit of angle depending on the length of the resampling length, a traveling path resample processing means for producing a data string of quantized angle information indicating the position sampling points by resampling a traveling path using a resampling length and an angle resolution which are determined by the resampling length and angle resolution determination means and a variable length coding means for variable length coding data of the data string, whereby the data variable length coded by the data variable length coding means are provided as traveling path information.

This probe car on-board apparatus can compress the data of traveling path using the digital map positional information compressing method of the invention for provision to a probe information collecting center.

BRIEF DESCRIPTION OF THE DRAWINGS

FIG. 8 is a flowchart showing the procedure of the resampling method according to the second embodiment, FIG. 16 is a drawing showing a relationship between a resampling length and an angle resolution which are used in a resampling method according to a seventh embodiment of the invention, FIG. 17 is a block diagram illustrating the configuration of a traffic information providing system according to the seventh embodiment of the invention, FIG. 20 is a drawing showing a relationship between resampling length and angle resolution $\delta$ and a distance error, FIG. 25 shows changes in resampling shape when angle resolutions $\delta$ are changed with a long resampling length through a comparison using printouts of actual digital maps, FIG. 26 is a drawing showing data sizes in accordance with angle resolutions $\delta$ when resampling a road in a mountainous area and a highway, FIG. 27 is a drawing showing a resampling shape (a) indicating a zigzag shape and a resampling shape obtained by a resampling method according to an eighth embodiment of the invention, FIG. 35 is a code table for use in variable length coding shape data.

Figure 1:
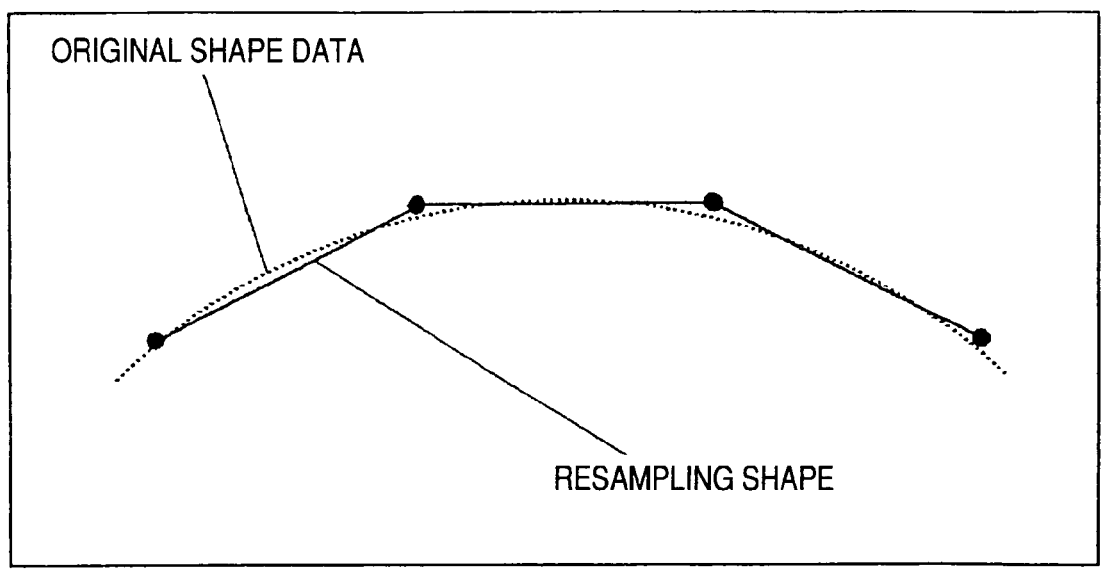
FIG. 1 is a drawing showing a resampling shape produced by resampling methods according to embodiments of the invention.

In addition, reference numerals in the drawings denote as below:

20: information transmitting device; 21: event information inputting unit; 22: digital map database A; 23: shape data extracting unit; 24: permissible error determination unit; 25: resampling length and angle resolution determination unit; 26: shape data resample processing unit; 27: compression data storing unit; 28: variable length coding processing unit; 29: shape data transmitting unit; 40: information utilizing device; 41: shape data receiving unit; 42: encoded data decoding unit; 43: shape data decoding unit; 44: information utilizing unit; 45: map matching unit; 46: digital map database B; 50: probe information collecting center; 51: traveling path receiving unit; 52: encoded data decoding unit; 53: traveling path shape decoding unit; 54: traveling path measured information utilizing unit; 60: probe car on-board apparatus; 61: own vehicle position determination unit; 62: traveling path storing unit; 63: traveling path shape resample processing unit; 64: variable length coding processing unit; 65: compressed data storing unit; 66: traveling path transmitting unit; 67: permissible error determination unit; 68: resampling length and angle resolution determination unit; 69: digital map database; 70: vehicle speed sensor; 71: steering wheel steering angle detecting sensor; 72: lateral G sensor; 73: GPS antenna; 74: gyro.

BEST MODE FOR CARRYING OUT THE INVENTION

In embodiments of the invention, a case will be described in which the shape of a road on a digital map is transmitted from a transmitting side to a receiving side.

In data compressing methods according to embodiments of the invention, in resampling, as shown in FIG. 1, sampling points are set such that a straight line (a resampling shape) which links between two sampling points (black circular points) represents most truly a curved line of the shape of a road (original shape data) in the segment.

The straight line which represents most truly the curved line of original shape means a straight line in which distance errors from the original shape exist uniformly on the left and right sides of the straight line. Some resampling methods for obtaining such a straight line (resampling shape) will be described in the following embodiments.

First Embodiment

In a resampling method according to a first embodiment of the invention, sampling points are set by paying attention to areas between a straight line which links between the sampling points and an original shape.

In resampling the shape of a road, an equidistance resampling is carried out on an object road after a resampling length L and an angle resolution (namely, a quantization unit for representing the position data of a sampling point in terms of angle) δ are determined.

Figure 4:
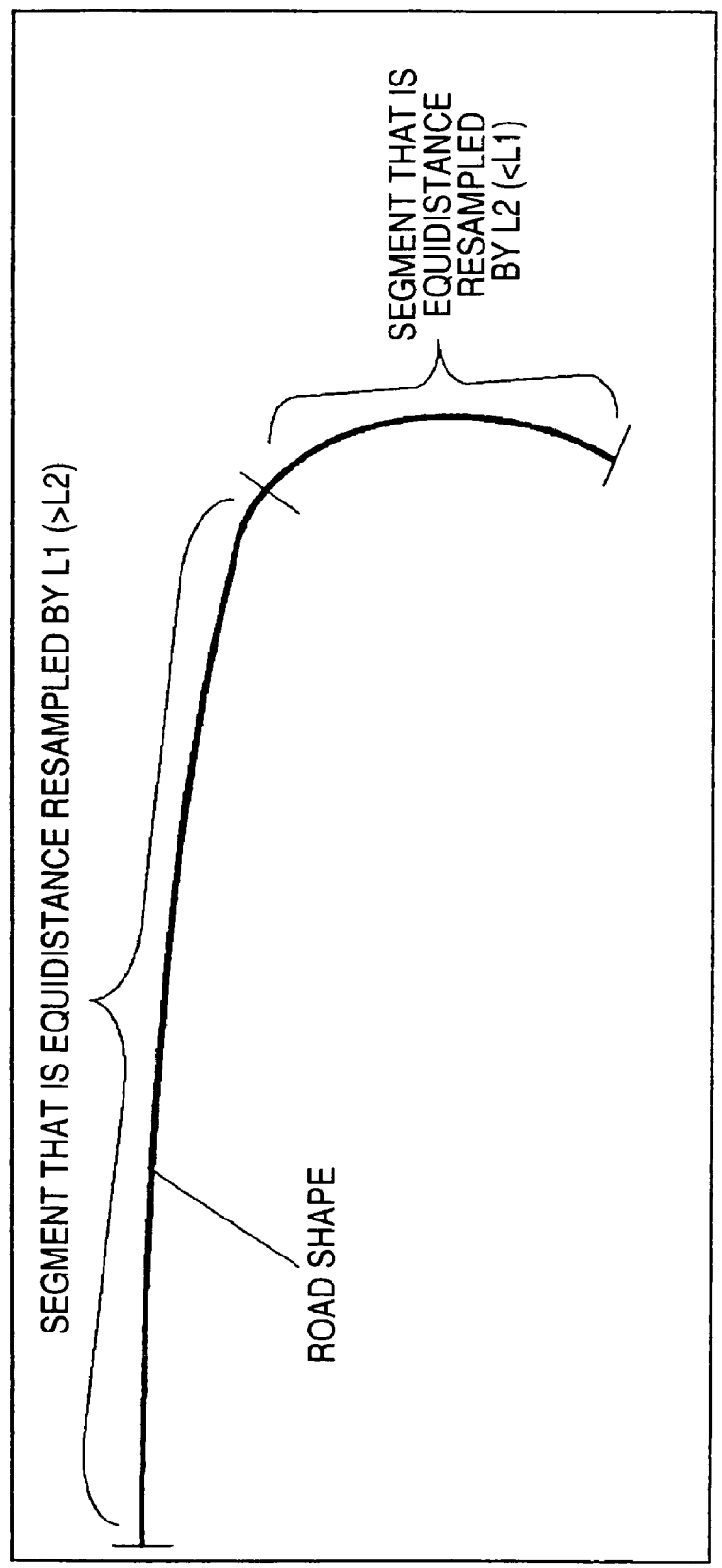
FIG. 4 is a drawing showing a relationship between the curvature of a road and the resampling length of an equidistance resampling.

The resampling length L is set short when a curved road having a large curvature or a road in a mountainous area where there are many such curved roads is the object of resampling and is set long when a rectilinear road having a small curvature or a road in an urban area where there are many such rectilinear roads is the object of resampling. For example, as shown in FIG. 4, a resampling length L1 for equidistance resampling a segment of the shape of a road which has a small curvature is set longer than a resampling length L2 for equidistance resampling a segment of the shape of the road which has a large curvature.

The angle resolution δ is set constant irrespective of resampling lengths or the magnitude of the angle resolution δ is changed depending on resampling lengths L, so that the angle resolution δ is set small when the resampling length L is long, whereas the angle resolution δ is set large when the resampling length L is short. Thus, in a case where the angle resolution δ is changed depending on resampling lengths L, even when the resampling length L is long, a deviation from the road position at the sampling point can be made small. In addition, even when the resampling length L is short, the increase in data size can be suppressed.

Figure 5B:
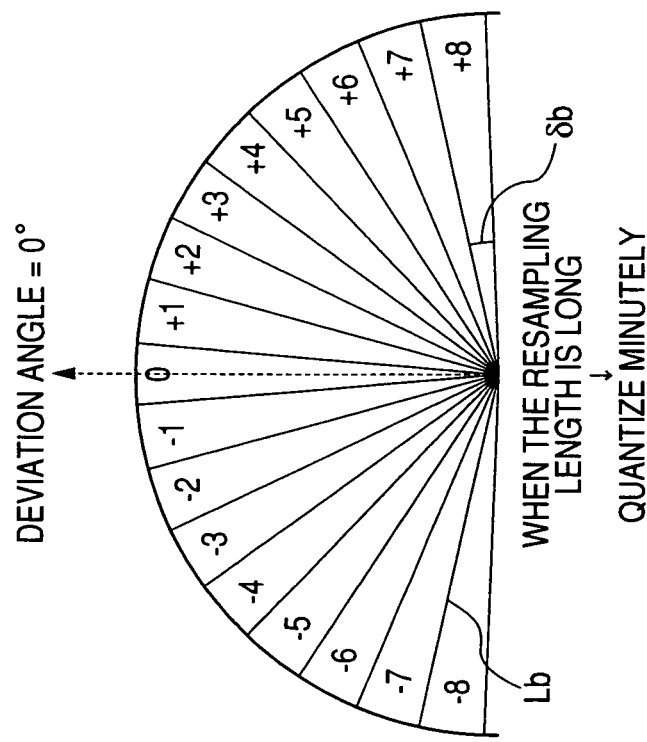
FIG. 5 is a drawing showing a relationship between a resampling length and an angle resolution $\delta$ which are used in the resampling method according to the first embodiment.
Figure 5A:
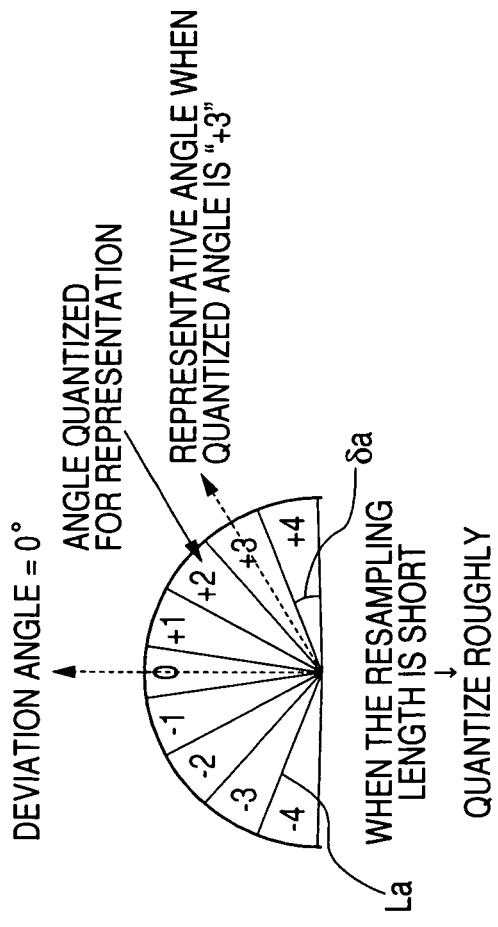

FIG. 5 shows exemplarily a relationship between the resampling length L and the angle resolution δ when the angle resolution (quantization unit) δ is changed depending on the resampling length L. The radius of a circle represents the resampling length L and a center angle of each of a plurality of divided segments represents δ. A resampling length Lb in FIG. 5B is twice as long as a resampling length La in FIG. 5A, and an angle resolution δb in FIG. 5B is set such that the length of the arc of each segment in FIG. 5B becomes equal to the length of the arc of each segment in FIG. 5A. In this case, δb is substantially half δa. Due to this, angles in a range of 180° are represented by nine quantized volumes in FIG. 5A, whereas in FIG. 5B, they are represented by 17 quantized volumes.

In addition, angles within the quantized range are all rounded off to an angle representative of the quantization volumes (representative angle). A center value (or a maximum value, a minimum value or a predetermined value) of the corresponding quantized range is set as the representative angle. In FIG. 5A, a representative angle of the quantized volume represented by +3 is shown by an arrow followed by a dotted line. In addition, the representative angle of each quantized range is represented by a quantized value (0, +1, −1, +2, −2, . . . ) from the deviation angle 0. Consequently, when a resampling is performed using La and δa in FIG. 5A, the angles within the range of 180° are represented by nine quantized values of 0, +/−1, +/−2, +/−3, +/−4, and when a resampling is performed using Lb and δb in FIG. 5B, the angles within the range of 180° are represented by seventeen quantized values of 0, +/−1, +/−2, +/−3, +/−4, +/−5, +/−6, +/−7, +/−8.

Figure 6:
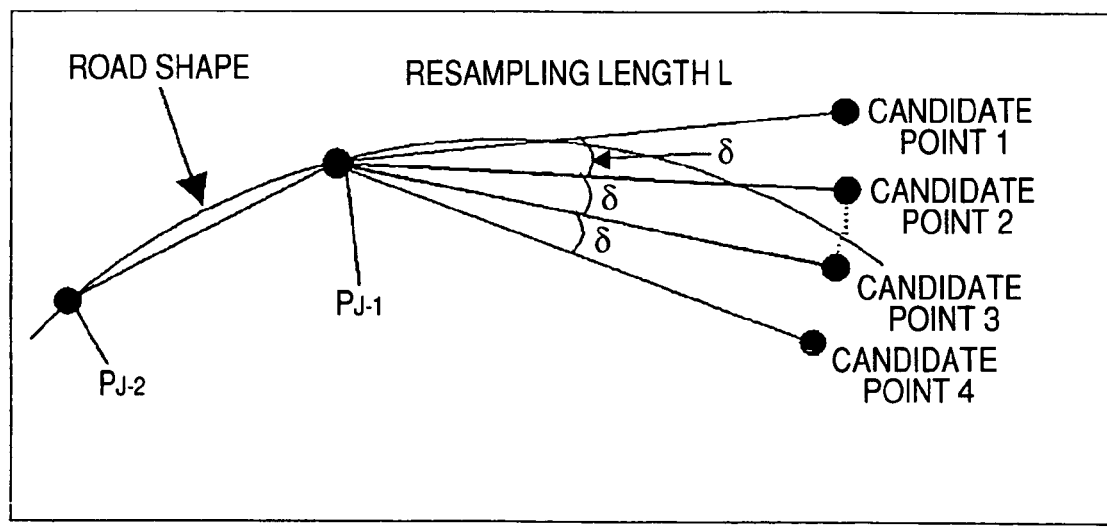
FIG. 6 is a drawing explaining candidate points set in the resampling method according to the first embodiment of the invention.

FIG. 6 shows a way in which an object road is resampled using determined resampling length L and angle resolution δ. When resampling the following sampling point PJ from a sampling point PJ−1, points which are a distance equal to the resampling distance L away from the sampling point PJ−1 on lines extending in directions of representative angles of the respective quantized ranges are temporarily set as candidate points for the sampling point PJ, and the sampling point PJ is selected from these candidate points. In the conventional resampling method, in this case, the candidate point which is closest to the road shape is selected as the sampling point PJ.

Figure 2A:
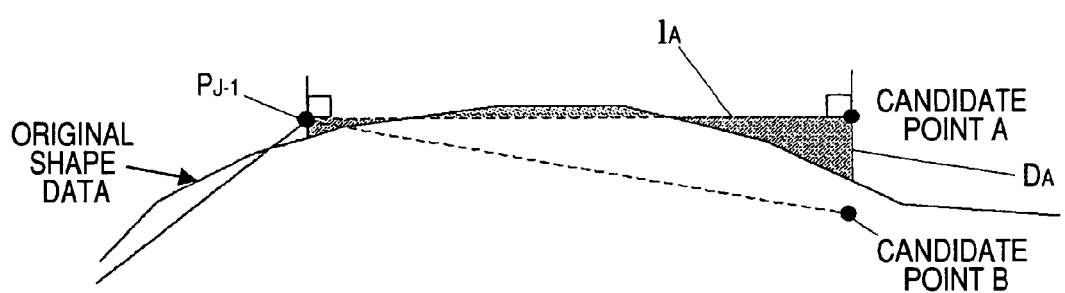
FIG. 2 is a drawing explaining a resampling method according to a first embodiment of the invention.
Figure 2B:
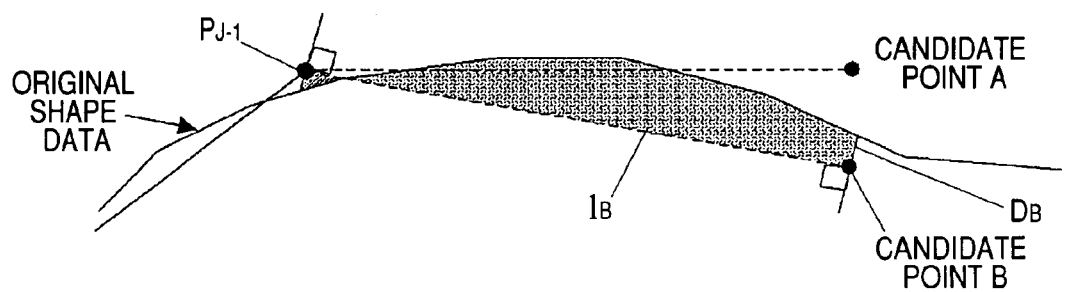

In contrast to this, in the resampling method according to the invention, as shown in FIG. 2, a sampling point PJ is selected from candidate points (candidate points A, B) for the sampling point PJ by evaluating not only a distance from the candidate points to the shape of a road (original shape data) but also areas between a straight line (1A, 1B) which links a sampling point PJ−1 with the candidate point A (or the candidate point B) and the original shape data. FIG. 2A shows areas between the straight line 1A connecting the sampling point PJ-1 with the candidate point A and the original shape data (areas surrounded by the straight line 1A, the original shape and normal lines which pass through the sampling point PJ-1 and the candidate point A and which intersect with the straight line 1A at right angles), and FIG. 2B shows areas between the straight line 1B connecting the sampling point PJ-1 with the candidate point B and the original shape data (areas surrounded by the straight line 1B, the original shape and normal lines which pass through the sampling point PJ-1 and the candidate point 1B and which intersect with the straight line 1B at right angles).

Evaluations of the respective candidate points are implemented by, for example, the following equation (1), and the candidate point which provides a smallest evaluation value is adopted as the sampling point PJ.

$$\text{Evaluation Value of Candidate Point } n = \alpha Dn + \beta(|Snr - Snl|) \qquad (1),$$

where:

Dn denotes a distance from a candidate point n to the original shape (a distance from the candidate point n on a normal line which passes through the candidate point n and which intersects with a straight line connecting the sampling point PJ-1 with the candidate point n to the original shape);

Snr denotes an area between the straight line connecting the sampling point PJ-1 and the candidate point n and the original shape data which is located on the right side of the straight line;

Snl denotes an area between the straight line connecting the sampling point PJ-1 and the candidate point n and the original shape data which is located on the left side of the straight line; and α,β denote set constants.

Here, assuming that the area on the right side of the straight line in connecting the sampling point PJ-1 and the candidate point n is positive and the area on the left side thereof is negative, |Snr−Snl| is an absolute value for a total value of the areas between the straight line in and the original shape resulting when they are added up. This value can be calculated by taking an integral of a graph of the original shape data with the straight line ln being regarded as an coordinate axis.

Figure 3:
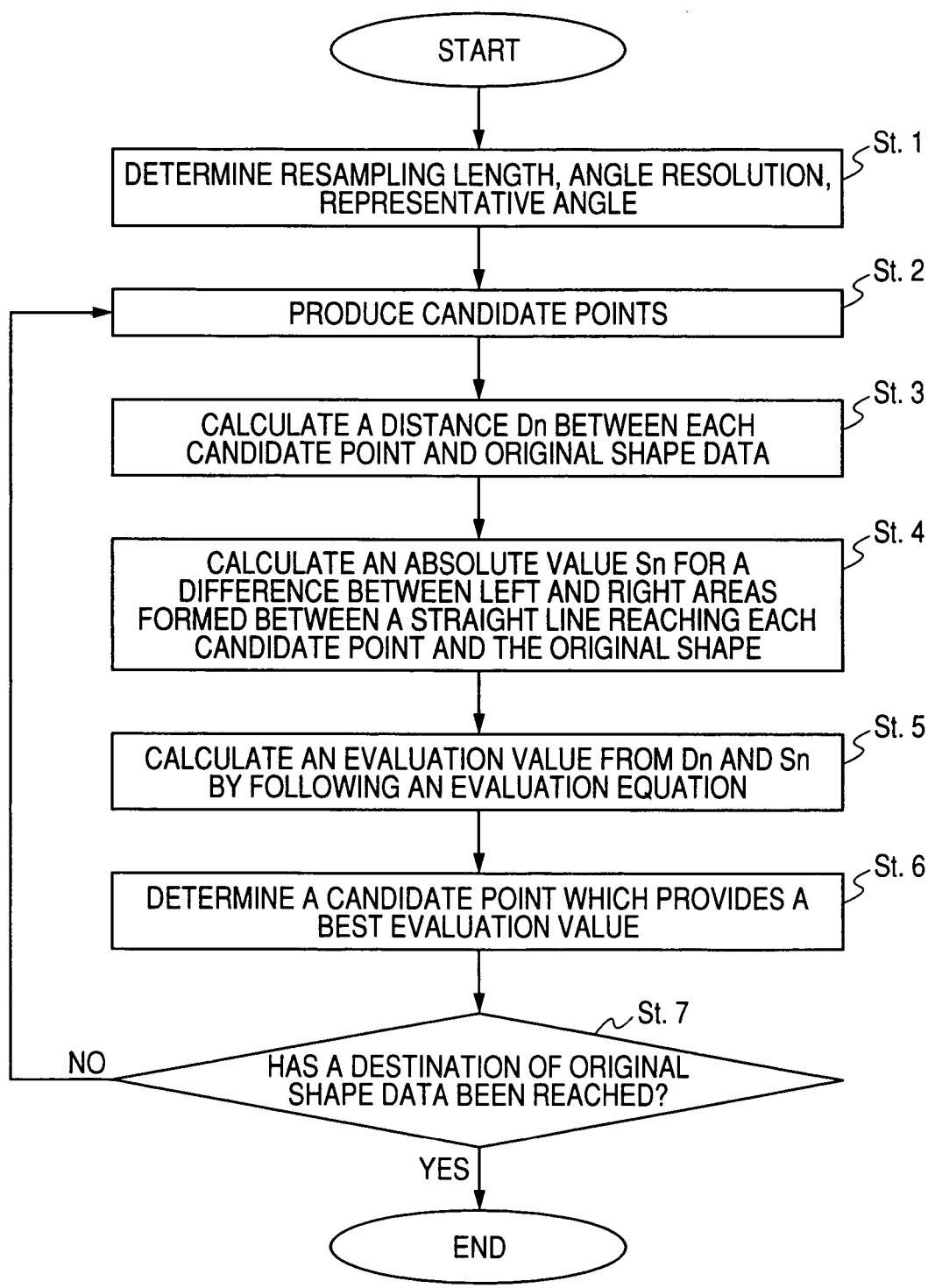
FIG. 3 is a flowchart showing the procedure of the resampling method according to the first embodiment of the invention.

A flowchart in FIG. 3 shows the procedure of this resampling.

A resampling length L for resampling an object road, an angle resolution δ and a representative angle are determined (Step 1). Next, an origin of the object road is set to a sampling point, and points which are the distance L away from an adjacent sampling point PJ-1 on straight lines extending in directions of representative angles in quantized ranges from the adjacent sampling point PJ-1 are set as candidate points for a sampling point PJ (Step 2). Next, a distance Dn between each candidate point and original shape data is calculated (Step 3), an absolute value Sn for a difference between the left and right areas formed between each of the straight lines reaching from the adjacent sampling point to the respective candidate points is calculated (Step 4), an evaluation value is calculated by the evaluation equation (1) using Dns and Sns which are so obtained (Step 5), and the candidate point whose evaluation value is the best (when using the evaluation equation (1), the candidate point which provides a smallest evaluation value) is determined as the sampling point PJ (Step 6). In the case of FIG. 2, while the candidate point A is farther away from the original shape than the candidate B, since an evaluation value calculated by the evaluation equation (1) for the candidate A is smaller than that for the candidate B, the candidate A is adopted as the sampling point PJ.

This procedure is repeated until a destination of the object road is reached (Step 7).

When performing a resampling like this, in a case where the original shape is curved, while sampling points which constitutes node points of the resampling shape are set at positions which slightly deviate from the original shape, the straight line which links between the sampling points while following the resampling shape constitutes, as shown in FIG. 1, a straight line which represents the curved line of the original shape most truly.

Due to this, a shape which most approximates to the original shape can be reproduced on the receiving side to which the data of the resampling shape have been transmitted.

In addition, in this resampling method, as shown in FIG. 2A, since the error between the resampling shape and the original shape data can be allocated uniformly to the left and right of the resampling shape (in other words, the resampling shape can be selected in such a manner that the resampling shape passes the center of the original shape), the maximum value of the error can be suppressed to a smaller level, as shown in FIG. 2B, when compared with a case where the error is located closer to one side of the resampling shape. Due to this, even in a case where a long resampling length is taken, the error can be accommodated within a predetermined permissible error. Namely, the resampling length can be elongated without exceeding the predetermined permissible error, thereby making it possible to enhance the compression coefficient of data to be transmitted.

Second Embodiment

In a resampling method according to a second embodiment of the invention, in setting sampling points, instead of the areas, the length of line segments of an original shape which are located to the left and right of a resampling shape is considered.

Figure 7A:
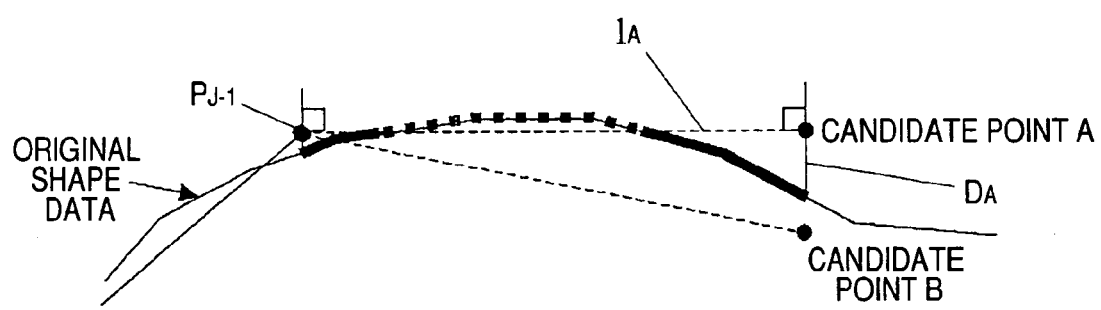
FIG. 7 is a drawing explaining a resampling method according to a second aspect of the invention.
Figure 7B:
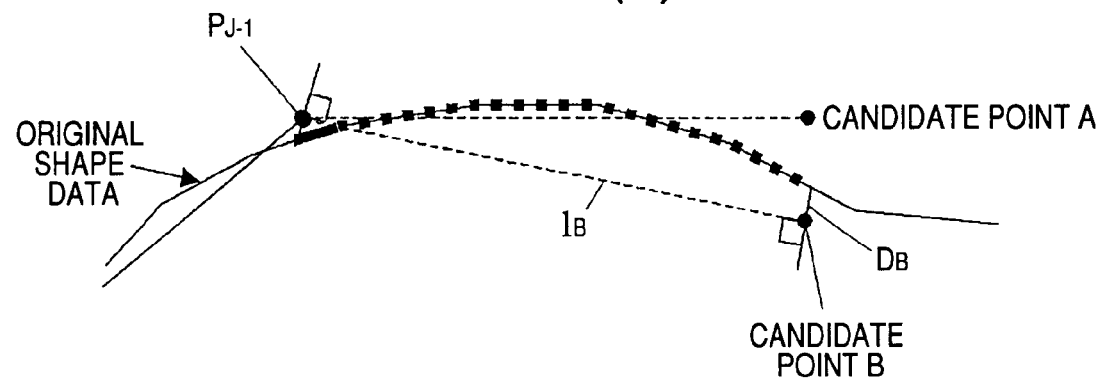

In this resampling method, a procedure followed until candidate points for a sampling point are set remains the same as that of the first embodiment. When a plurality of candidate points have been set completely, as shown in FIG. 7, a sampling point is selected from the candidate points so set in consideration of distances DA, DB from the candidate points to the shape of a road (original shape data), as well as the length of line segments of the original shape which are divided to the left and right thereof by straight lines 1A, 1B.

As this occurs, the following equation (2) is used as an evaluation equation, and the candidate point which provides a smallest evaluation value is adopted as a sampling point PJ.

$$\text{Evaluation Value of Candidate Point } n = \alpha Dn + \beta(|Lnr - Lnl|) \qquad (2),$$

where:

Dn denotes a distance from a candidate point n to the original shape;

Lnr denotes the length of a line segment of the original shape which is located on the right side of a straight line connecting a sampling point PJ-1 and the candidate point (indicated by a thick solid line in FIG. 7);

Lnl denotes the length of a line segment of the original shape which is located on the left side of the straight line connecting the sampling point PJ−1 and the candidate point (indicated by a thick solid line in FIG. 7); and α,β denote set constants.

Here, assuming that the length of the line segment of the original shape which is located on the right side of the straight line Ln which connects the sampling point PJ−1 and the candidate point n is positive and the length of the line segment which is located on the left side thereof is negative, |Lnr−Lnl| is an absolute value for a total value of the lengths of the line segments of the original shape resulting when they are added up.

A flowchart in FIG. 8 shows the procedure of this resampling. The procedure from Step 1 to Step 3 remains the same as that of the first embodiment (FIG. 3). Namely, a resampling length L for resampling an object road, an angle resolution δ and a representative angle are determined (Step 1), points which are the distance L away from an adjacent sampling point PJ−1 on straight lines extending in directions of representative angles in quantized ranges from the adjacent sampling point PJ−1 are set as candidate points for a sampling point PJ (Step 2), and a distance Dn between each candidate point and original shape data is calculated (Step 3).

Next, by paying attention to the lengths of the line segments of the original shape which are divided by the straight lines reaching from the adjacent sampling point to the respective candidate points, an absolute value Ln for a difference between the length of the line segment of the original shape located to the right of the straight lines and the length of the line segment thereof located to the left thereof (Step 4), an evaluation value is calculated by the evaluation equation (2) using Dns and Sns (Step 5), and the candidate point whose evaluation value is the best (when using the evaluation equation (2), the candidate point which provides a smallest evaluation value) is determined as the sampling point PJ (Step 6). In the case of FIG. 7, while the candidate point A is farther away from the original shape than the candidate B, since an evaluation value calculated by the evaluation equation (2) for the candidate A is smaller than that for the candidate B, the candidate A is adopted as the sampling point PJ.

This procedure is repeated until a destination of the object road is reached (Step 7).

Also when performing this resampling, the straight line which links between the sampling points while following the resampling shape constitutes, as shown in FIG. 1, a straight line which represents the curved line of the original shape most truly.

Due to this, a shape which most approximates to the original shape can be reproduced on the receiving side to which the data of the resampling shape have been transmitted. In addition, the resampling length can be elongated without exceeding the predetermined permissible error, thereby making it possible to enhance the compression coefficient of data to be transmitted.

Third Embodiment

In a resampling method according to a third embodiment of the invention, sampling points are set in consideration of a maximum error between a resampling shape and an original shape.

Figure 9A:
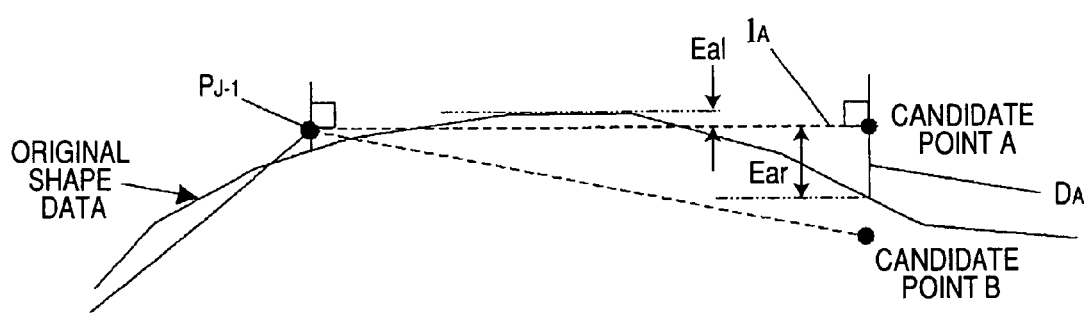
FIG. 9 is a drawing explaining a resampling method according to a third embodiment of the invention.
Figure 9B:
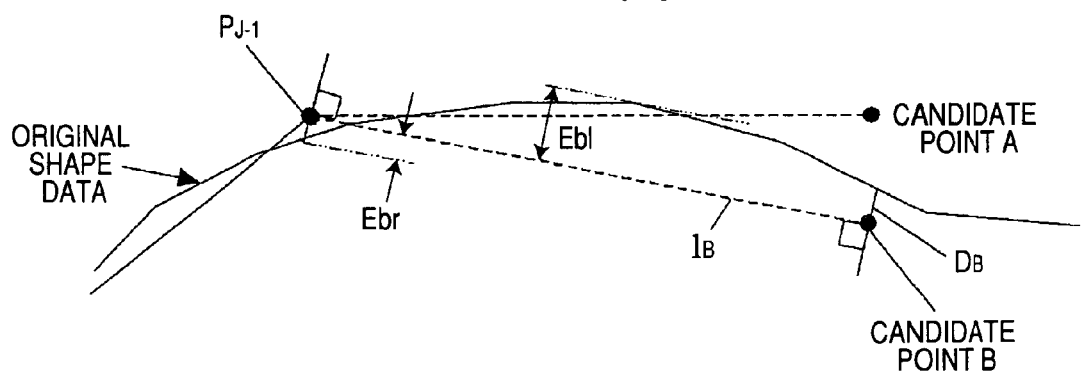

In this resampling method, a procedure followed until candidate points for a sampling point are set remains the same as that of the first embodiment. When a plurality of candidate points have been set completely, as shown in FIG. 9, a sampling point is selected from the candidate points so set in consideration of distances DA, DB from the candidate points to the shape of a road (original shape data), as well as the balance between maximum errors on the left and right of straight lines lA, lB (namely, maximum distances from the lines lA, lB to the shape data).

As this occurs, the following equation (3) is used as an evaluation equation, and the candidate point which provides a smallest evaluation value is adopted as a sampling point PJ.

$$\text{Evaluation Value of Candidate Point } n = \alpha Dn + \beta (|Enr - Enl|) \quad (3),$$

where:

Dn denotes a distance from a candidate point n to the original shape;

Enr denotes a maximum error (in FIG. 9, indicated as Ear, Ebr) to the original shape which is located on the right side of a straight line which connects the sampling point PJ−1 with a candidate point n;

Enl denotes a maximum error (in FIG. 9, indicated as Eal, Ebl) to the original shape which is located on the left side of the straight line which connects the sampling point PJ−1 with the candidate point n; and α,β denote set constants.

Here, assuming that the maximum error to the original shape which is located on the right side of the straight line ln which connects the sampling point PJ−1 with the candidate point n is positive and the maximum error to the original shape which is located on the left side thereof is negative, |Enr−Enl| is an absolute value for a total value of the maximum errors when they are added up.

Figure 10:
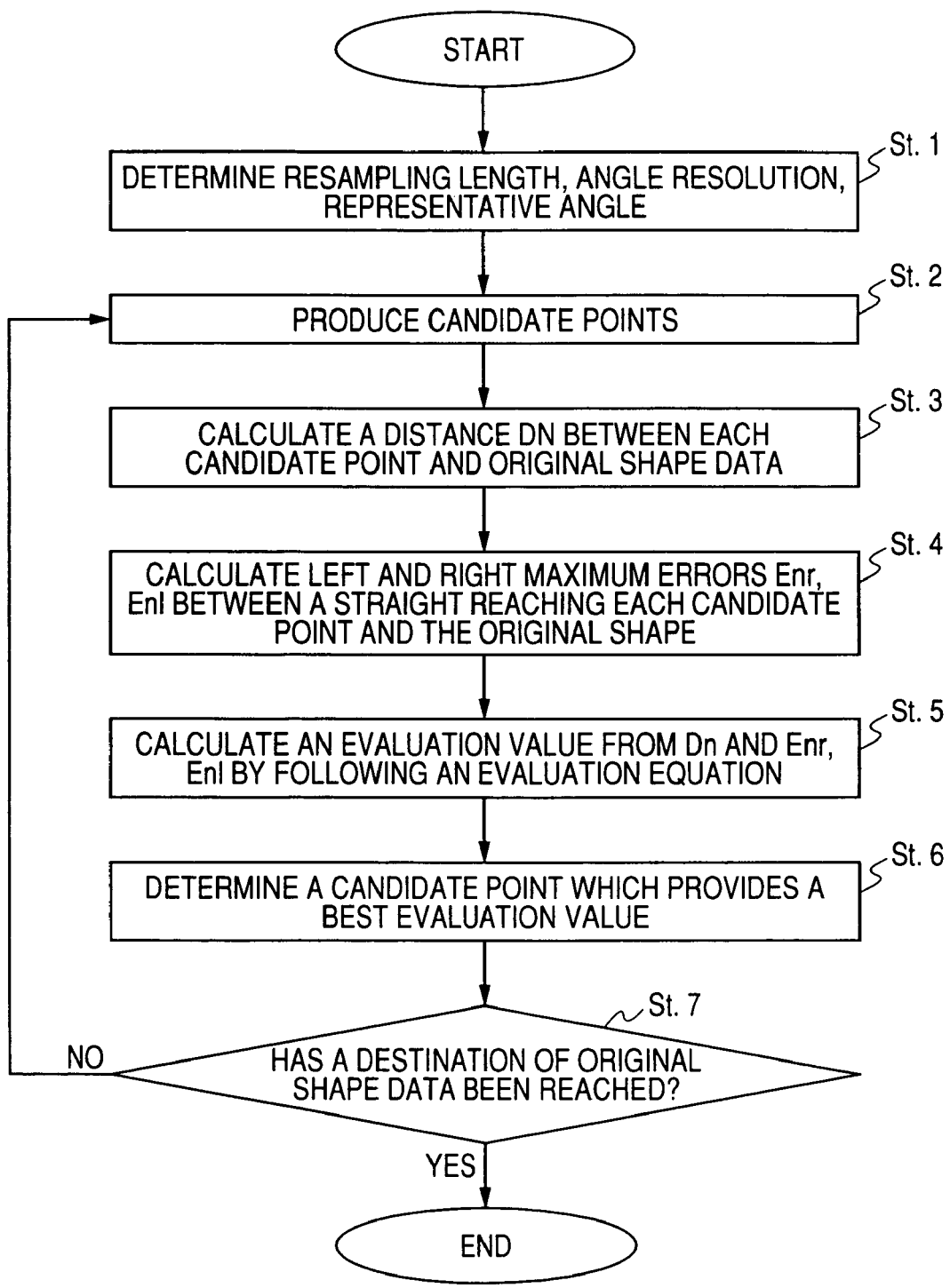
FIG. 10 is a flowchart showing the procedure of the resampling method according to the third embodiment of the invention.

A flowchart in FIG. 10 shows the procedure of this resampling. The procedure from Step 1 to Step 3 remains the same as that of the first embodiment (FIG. 3). Namely, a resampling length L for resampling an object road, an angle resolution δ and a representative angle are determined (Step 1), points which are the distance L away from an adjacent sampling point PJ−1 on straight lines extending in directions of representative angles in quantized ranges from the adjacent sampling point PJ−1 are set as candidate points for a sampling point PJ (Step 2), and a distance Dn between each candidate point and original shape data is calculated (Step 3).

Next, maximum errors Enr to the original shape which are located on the right side of the straight lines reaching from an adjacent sampling point to the respective candidate points and maximum errors Enl to the original shape which are located on the left side thereof are calculated (Step 4), an evaluation value is calculated by the evaluation equation (3) using Dns and Enrs, Enls (Step 5), and the candidate point whose evaluation value is the best (when using the evaluation equation (3), the candidate point which provides a smallest evaluation value) is determined as the sampling point PJ (Step 6). In the case of FIG. 9, while the candidate point A is farther away from the original shape than the candidate B, since an evaluation value calculated by the evaluation equation (3) for the candidate A is smaller than that for the candidate B, the candidate A is adopted as the sampling point PJ.

This procedure is repeated until a destination of the object road is reached (Step 7).

Also when performing this resampling, the straight line which links between the sampling points while following the resampling shape constitutes, as shown in FIG. 1, a straight line which represents the curved line of the original shape most truly.

Due to this, a shape which most approximates to the original shape can be reproduced on the receiving side to which the data of the resampling shape have been transmitted. In addition, the resampling length can be elongated without exceeding the predetermined permissible error, thereby making it possible to enhance the compression coefficient of data to be transmitted.

Note that the following equation (4) may be used as the evaluation equation and a candidate point whose evaluation value is the smallest may be adopted as the sampling point PJ.

$$\text{Evaluation Value of Candidate Point} = \alpha Dn + \beta \, \text{Max} \, (Enr, Enl) \qquad (4)$$

where Max (Enr, Enl) denote larger values of the maximum errors which are located to the left and right of the straight line ln which connects the sampling point PJ-1 with the candidate point n. In this case, the candidate points are evaluated by paying attention to the magnitude itself of the maximum errors not to the balance between the maximum errors located to the left and right of the straight line ln.

Fourth Embodiment

In a fourth embodiment of the invention, a resampling method will be described by which the selection of candidate points can be implemented in a simple and easy process.

In this resampling method, the procedure taken until candidate points for a sampling point are set remains the same as that used in the first embodiment. A resampling length L used in setting the candidate points is selected depending on the curvature of original shape data so as to be a length which allows the curve of the original shape data to be traced to almost a complete extent. Due to this, a sampling point which regulates a resampling shape which passes the center of the original shape (a resampling shape in which errors from the original shape data uniformly exist to the left and right thereof) exists on the left side of the original shape in the event that the original shape curves rightward, whereas in the event that the original shape curves leftward, the sampling point exists on the right side of the original shape.

Figure 11:
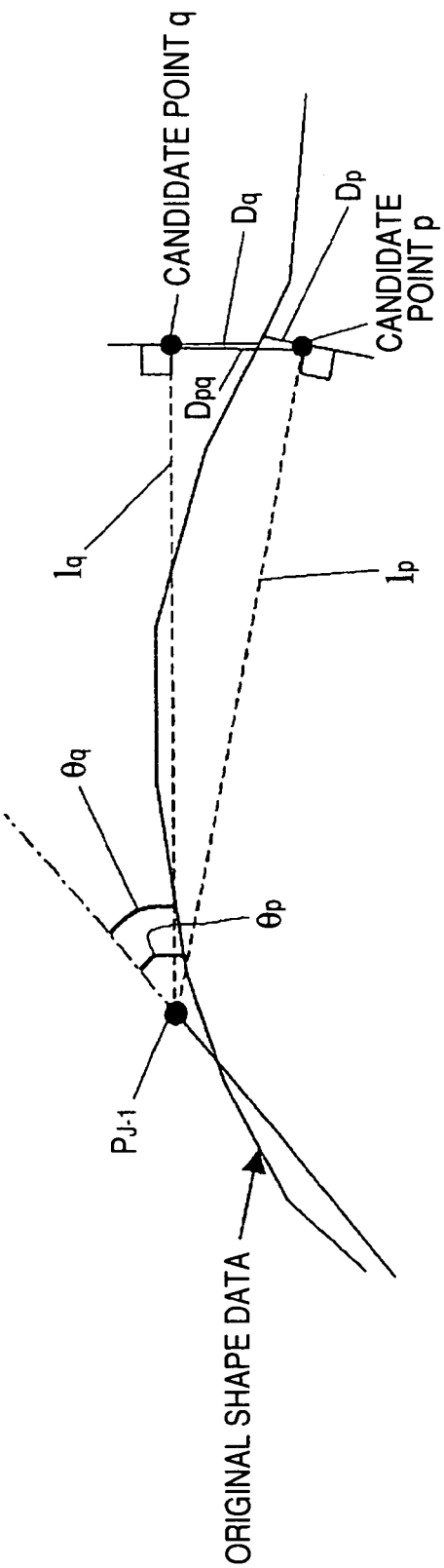
FIG. 11 is a drawing explaining a resampling method according to a fourth embodiment of the invention.

Namely, as shown in FIG. 11, of two candidate points p, q which hold the original shape therebetween, a candidate point having a smaller deviation angle absolute value θp or θq can regulate a resampling shape which is closer to the center of the original shape data.

Based on this rationale, candidate points which are adopted as a sampling point will be determined under the following determination standard.

Assuming that a candidate point which is closest to the original shape data is p, and a candidate point which is second closest thereto is q, and that a distance from the candidate point p to the original shape is Dp, a distance from the candidate point q to the original shape is Dq and a distance between the candidate point p and the candidate point q is Dpq, The candidate point p is adopted in the event that the deviation angle absolute value θp is smaller than the deviation angle absolute value θp of the candidate point q; and In the event that the deviation angle absolute value θp is larger than the deviation angle absolute value θp of the candidate point q, (1) the candidate point p is adopted when $Dp/Dpq \leq \gamma$ ($\gamma$ is a predetermined constant of on the order of 0.1), and (2) in other cases, the candidate point q is adopted.

Figure 12:
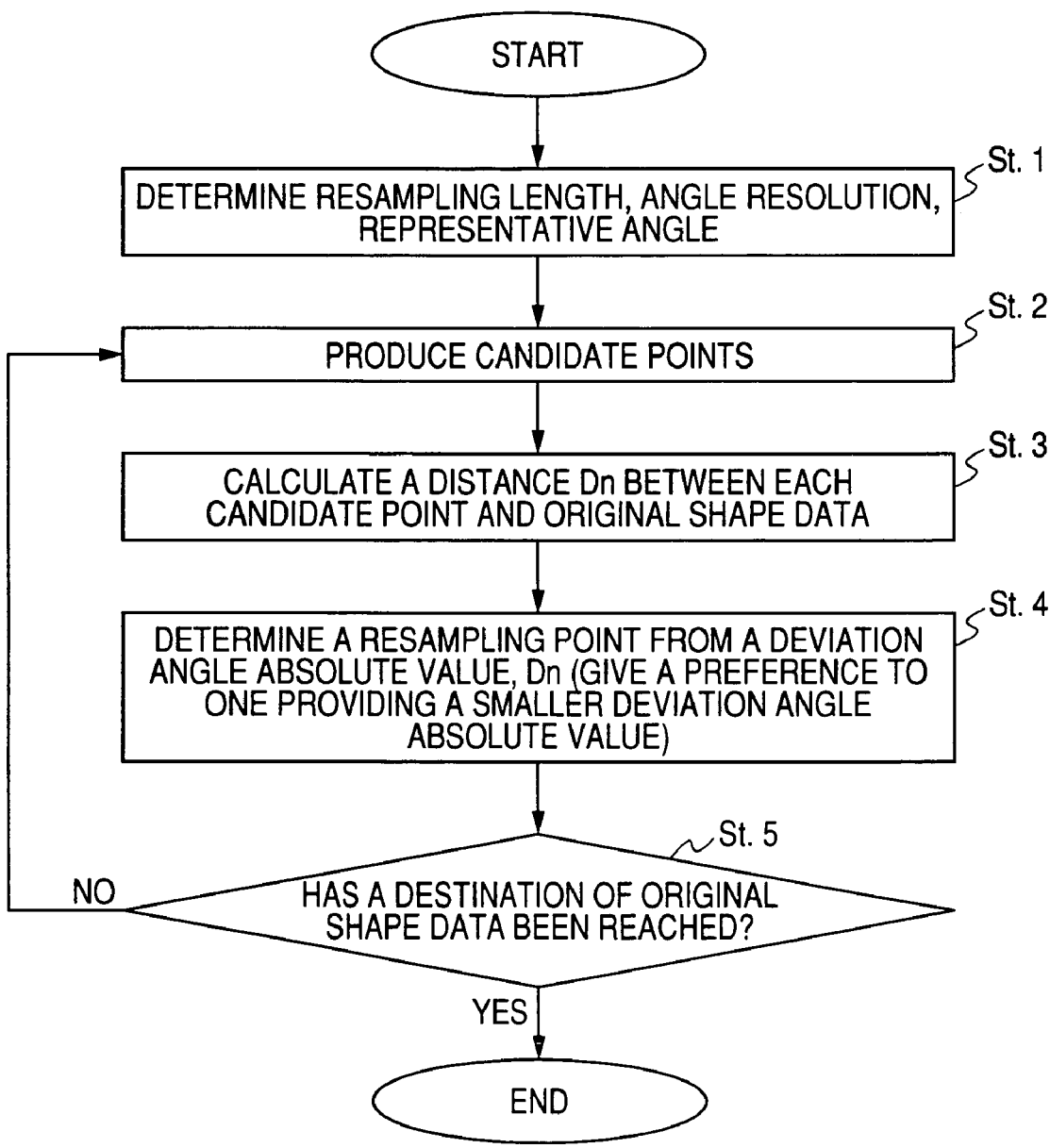
FIG. 12 is a flowchart showing the procedure of the resampling method according to the fourth embodiment of the invention.

A flowchart in FIG. 12 shows the procedure of this resampling. The procedure from Step 1 to Step 3 remains the same as that of the first embodiment (FIG. 3). Namely, a resampling length L for resampling an object road, an angle resolution δ and a representative angle are determined (Step 1), points which are the distance L away from an adjacent sampling point PJ-1 on straight lines extending in directions of representative angles in quantized ranges from the adjacent sampling point PJ-1 are set as candidate points for a sampling point PJ (Step 2), and a distance Dn between each candidate point and original shape data is calculated (Step 3).

Next, a candidate point that is to be adopted as a sampling point is determined to the determination standard using the deviation angle absolute values and Dns (Step 4).

In the case of FIG. 11, while the candidate point q is farther away from the curve of the original shape than the candidate point p, since the deviation angle absolute value θp of the candidate point q is smaller than the deviation angle absolute value θp of the candidate point p, complying with the determination standard, the candidate point q is adopted as a sampling point PJ.

This procedure is repeated until a destination of the object road is reached (Step 7).

In this resampling method, a straight line representing the curve of the original shape can be obtained by the simple and easy method. A shape which most approximates to the original shape can be reproduced on the receiving side to which the data of the resampling shape have been transmitted. In addition, the resampling length can be elongated without exceeding the predetermined permissible error, thereby making it possible to enhance the compression coefficient of data to be transmitted.

Fifth Embodiment

In a fifth embodiment of the invention, a traffic information providing system will be described which provides traffic information through the application of the compression methods of the invention.

Figure 13:
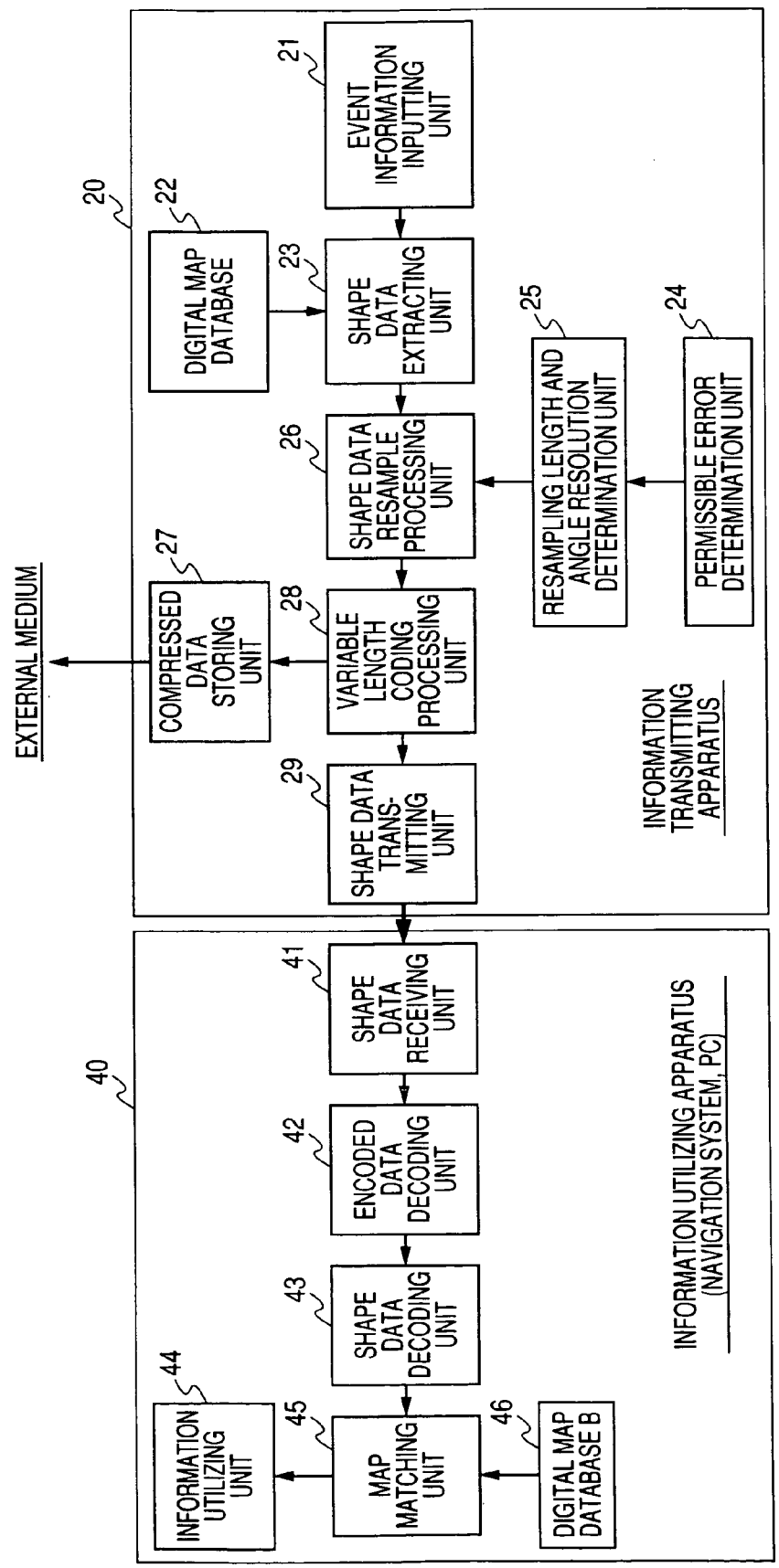
FIG. 13 is a block diagram illustrating the configuration of a traffic information collecting system according to a fifth embodiment of the invention.

As shown in FIG. 13, this system is made up of an information transmitting apparatus 20 for providing traffic information and an information utilizing apparatus 40 such as an on-board navigation system or a personal computer for making use of the traffic information so provided. The information transmitting apparatus 20 includes an event information inputting unit 21 to which information on traffic jams or traffic accidents is inputted, a shape data extracting unit 23 for extracting road shape data of an object road segment from a digital map database A22, a permissible error determination unit 24 for determining a permissible error between a resampling shape and original shape data, a resampling length and angle resolution determination unit 25 for determining a resampling length L and an angle resolution δ based on the permissible error, shape data resample processing unit 26 for producing a data string of the position of a sampling point by resampling the road shape data extracted by the shape data extracting unit 23, a variable length coding processing unit 28 for compression encoding data produced by the shape data resample processing unit 26, a compressed data storing unit 27 for storing the compression encoded road shape data for provision of the stored data to an external medium and a shape data transmitting unit 29 for transmitting the compression encoded road shape data.

Then, the information utilizing apparatus 40 includes a shape data receiving unit 41 for receiving the road shape data so provided, an encoded data decoding unit 42 for decoding the compression encoded data, a shape data restoring unit 43 for restoring the resampling shape, a map matching unit 45 for performing a map matching using data of a digital map database B46 so as to identify the road segment represented by the sampling point on a digital map and an information utilizing unit 44 for making use of traffic information so given.

In the information transmitting apparatus 20, the resampling length and angle resolution determination unit 25 determines a resampling length L used in resampling, an angle resolution δ and a representative angle based on the permissible error determined at the permissible error determination unit 24. The shape data resample processing unit 26 resamples the road shape data of the object road extracted by the shape data extracting unit 23 using the determined resampling length L used angle resolution δ and representative angle.

As this occurs, the shape data resample processing unit 26 resamples the road shape data using any of the resampling methods according to the first to fourth embodiments so as to set a sampling point. Then, the shape data resample processing unit 26 represents the position information of the sampling point by a deviation angle quantized value and produces as the road shape data of the object road a data string in which a resampling segment length change code which indicates a changeover position of resampling lengths and the length of the L and deviation angle quantized values of the respective sampling points are arranged.

The variable length coding processing unit 28 variable length codes the road shape data. The road shape data, which have been data compressed through variable length coding, are recorded on an external medium for provision or transmitted from the shape data transmitting unit 29.

In the information utilizing apparatus 40 which has received the road shape data, the encoded data decoding unit 42 decodes the compression encoded data, and the shape data restoring unit 43 restores the position information of the sampling points to thereby reproduce the resampling shape in which the sampling points are linked. This resampling shape is superimposed on the digital map on the display screen of the information utilizing apparatus 40 for display.

In addition, in order to identify the transmitted road segment accurately, the map matching unit 45 implements a map matching of the position data of the sampling points with map data on the digital map database B46 to thereby identify the object road on the map data of the digital map database B46.

The information utilizing unit 44 makes use of the traffic information so obtained by displaying the same on the screen or using it for searching a route.

Thus, in the traffic information providing system, since the information transmitting apparatus 20 resamples the road shape data of the object road by the resampling methods according to the first to fourth embodiments, the information utilizing apparatus 40, which is provided with the information, can reproduce a resampling shape which approximates to the road shape of the object road most truly. In addition, since the resampling methods according to the first to fourth embodiments are used, the data volume of the road shape data provided from the information transmitting apparatus 20 is small.

Sixth Embodiment

In a sixth embodiment according to the invention, a probe information collecting system will be described in which the compression methods of the invention are used to compress probe information to be collected.

Figure 14:
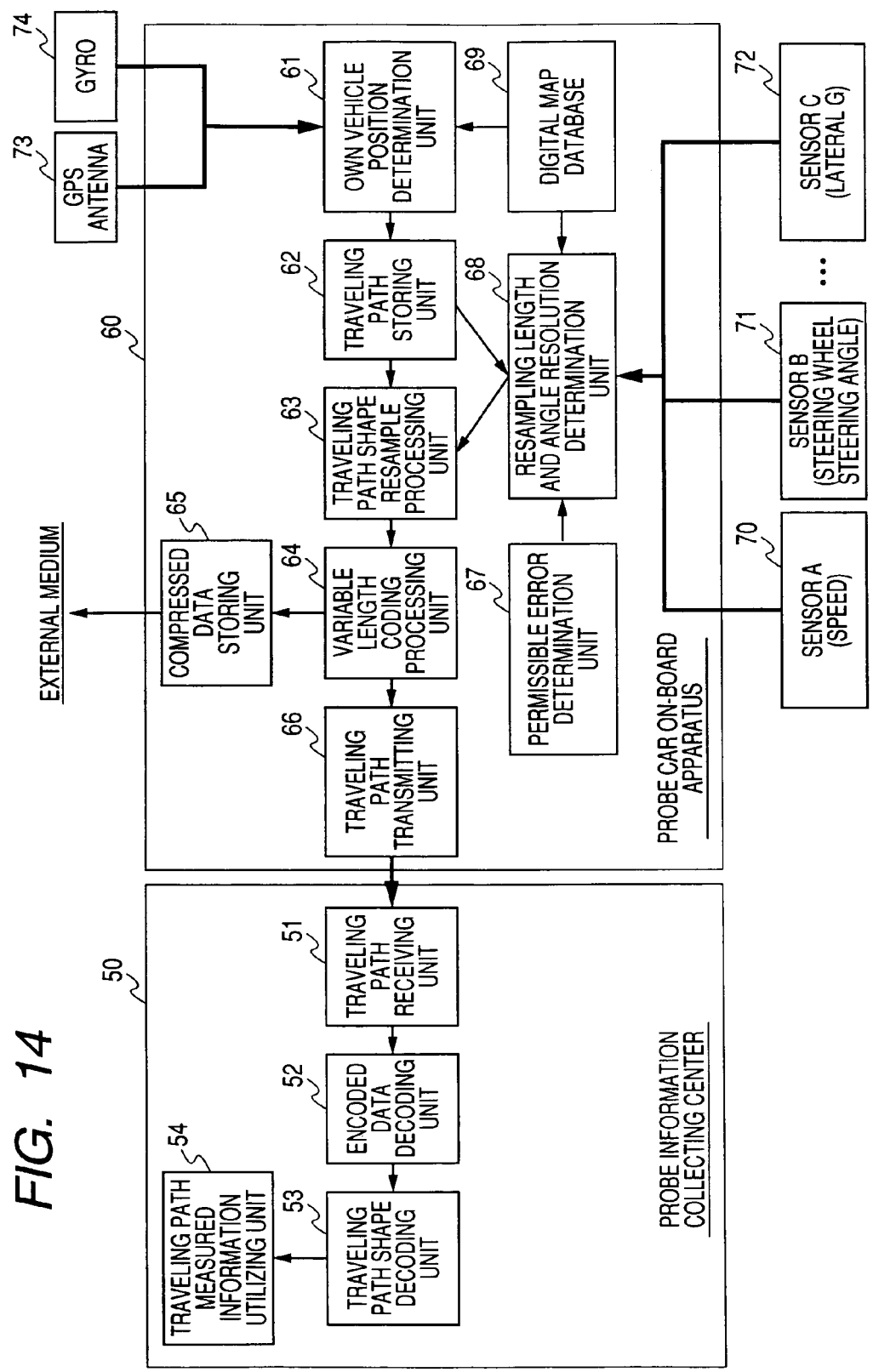
FIG. 14 is a block diagram illustrating the configuration of a probe information collecting system according to a sixth embodiment of the invention.
Figure 15A:
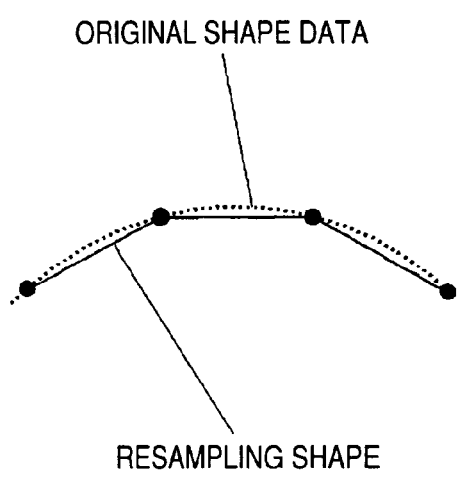
FIG. 15 is a drawing explaining problems inherent in a conventional resampling method.
Figure 15B:
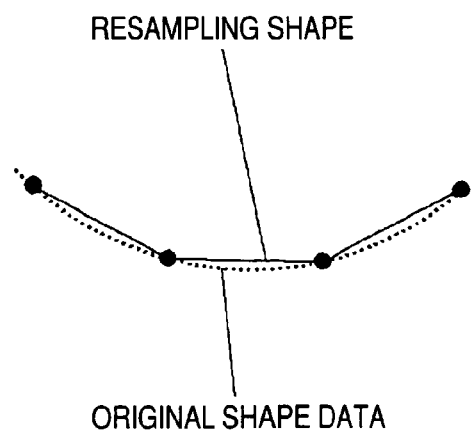

As shown in FIG. 14, this system is made up of a probe car on-board apparatus 60 for providing probe information and a probe information collecting center 50 for collecting probe information. The probe car on-board apparatus 60 includes an own vehicle position determination unit 61 for determining the position of the own vehicle based on information received from a GPS antenna 73 and information detected by a gyro 74, a sensor 70 for detecting speeds, a sensor 71 for detecting the steering angle of a steering wheel, a sensor 72 for detecting a lateral acceleration (a lateral G), a digital map database 69, a permissible error determination unit 67 for determining a permissible error between a resampling shape and the shape of a road, a resampling length and angle resolution determination unit 68 for determining a resampling length L for use in resampling and an angle resolution δ, a traveling path storing unit 62 for storing a traveling path of the own vehicle, a traveling path shape resample processing unit 63 for resampling a traveling path to produce a data string of position data of a sampling point, a variable length coding processing unit 64 for compression encoding data produced by the traveling path shape resample processing unit 63, a compressed data storing unit 65 for storing compression encoded traveling path shape data and a traveling path transmitting unit 66 for transmitting the compression encoded traveling path shape data.

Then, the probe information collecting center 505 includes a traveling path receiving unit 51 for receiving the traveling path shape data for receiving the traveling path shape data provided from the probe car on-board apparatus 60, an encoded data decoding unit 52 for decoding the compression encoded data so received, a traveling path shape restoring unit 53 for restoring the traveling path shape from the data so decoded and a traveling path and measured information utilizing unit 54 for making use of traveling path and measured information which are collected from the probe car on-board apparatus 60 for production of traffic information.

Positions of the own vehicle detected by the own vehicle position determination unit 61 are sequentially stored in the traveling path storing unit 62 of the probe car on-board apparatus 60 as traveling path thereof. The resampling length and angle resolution determination unit 68 determines the magnitude of the curvature of the traveling path from information on speeds, steering wheel steering angles and lateral G which is detected by the sensors 70, 71, 72 and road shapes obtained from the digital map database 69 and then determines a resampling length L for use in resampling and an angle resolution δ based on the magnitude of the curvature so determined and the permissible error determined at the permissible error determination unit 67.

The traveling path shape resample processing unit 63 reads out the traveling path data stored in the traveling path storing unit 62 when the probe information is transmitted and resamples the traveling path shape using the resampling length and the angle resolution δ which were determined by the resampling length and angle resolution determination unit 68 and a representative angle.

As this occurs, the traveling path shape resample processing unit 63 resamples the traveling path data by any of the resampling methods according to the first to fourth embodiments so as to set a sampling point. Then, the traveling path shape resample processing unit 63 represents the position information of the sampling point by a deviation angle quantized value and produces a data string in which deviation angle quantized values of the respective sampling points are arranged as traveling path data.

The variable length coding processing unit 64 variable length codes the data so as to compress the same. The compression encoded data are transmitted to the probe information collecting center 50. In addition, there may be a case where the data are stored in an external medium for provision to the probe information collecting center 50.

In the probe information collecting center 50, the encoded data decoding unit 52 decodes the data collected from the probe car on-board apparatus 60, and the traveling path shape restoring unit 53 restores the position information of the sampling points so as to reproduce the resampling shape of the traveling path. The information on traveling path is used together with the measured information such as speeds which is measured at the probe car on-board apparatus 60 for production of traffic information.

Thus, in this probe information collecting system, since the probe car on-board apparatus 60 resamples the traveling path by the resampling methods according to the first to fourth embodiments, the probe information collecting center 50 can reproduce a resampling shape that approximates to the traveling path most truly. In addition, the data volume of traveling path data provided from the probe car on-board apparatus 60 is small.

Note that while, in each embodiment, the case has been described where the road shape on the digital map is resampled for transmission, the invention can be applied to not only the transmission of roads but also the transmission of vector shapes such as rivers and railways, administrative boundaries and contours on the digital map. In addition, the invention can be applied to the transmission of shapes of various kinds patterns and finger prints, in addition to digital maps.

In addition, the vector data compressing methods of the invention can be applied to not only the transmission of data but also the storage and retention of the shapes of maps, patterns and finger prints in a compressed fashion.

Seventh Embodiment

In a seventh embodiment of the invention, a method will be described in which a deviation from the road position of a sampling point that is set by resampling is made small by changing an angle resolution (namely, a quantization unit) $\delta$ depending on resampling lengths L.

As has been described before, when resampling the shape of a road by the quantization unit $\delta$ of an angle component, a maximum value of an error Ea between the position of a sampling point and the position of the road is substantially equal to $(L \times |san(\delta/2)|$.

A relationship between the maximum value of the distance error Ea and resampling length L and quantization unit $\delta$ is shown in FIG. 20. The occurrence of an erroneous matching is largely related to the distance error Ea between the road shape and the sampling point, and the greater the distance error Ea is, the higher the possibility of erroneous matching is, whereas the smaller the distance error Ea is, the lower the possibility of erroneous matching is.

As is seen from FIG. 20, in the event that the resampling length L is 1280 mm when $\delta=3°$, an error of 33.5 m occurs. In contrast to this, in the event that the resampling length is long, even when $\delta=6°$ (in other words, even when there exists a slight deviation), the distance error Ea is allowed to fall within several meters, and the possibility of erroneous matching becomes low.

On the other hand, the data size of data produced through compression coding reduces as $\delta$ becomes larger and also reduces as the resampling length becomes longer.

Consequently, when the resampling length L is set long, even in case $\delta$ is set small in order to suppress the distance error Ea, the increase in data size can be avoided, and when the resampling length L is set short, even in case the data size is suppressed by setting $\delta$ large, the distance error Ea can be suppressed to a small value.

FIG. 16 exemplary shows a relationship between resampling length L and quantization unit $\delta$ which are set in a position information compressing method of this embodiment. The radius of a circle represents the resampling length L, and a center angle of each of a plurality of divided sectors represents $\delta$. A resampling length Lb in FIG. 16B has a length which is twice longer than a resampling length La in FIG. 16a, and a quantization unit $\delta$ in FIG. 16b is set such that the length of the arc of each segment in FIG. 16b equals the length of the arc of each segment in FIG. 16a. In this case, $\delta b$ is substantially half $\delta a$. Due to this, an angle in the range of 180° is represented by 9 quantized volumes in FIG. 16a, whereas in FIG. 16b, the same is represented by 17 quantized volumes.

Thus, in the event that the relationship between the resampling length L and the quantization unit $\delta$ is set such that the length of the arc of each segment becomes constant, the maximum value of the distance error Ea becomes constant irrespective of the length of the resampling length L. Consequently, the distance error Ea can be suppressed within the permissible error by the resampling method in which the quantization unit $\delta$ is changed depending on resampling lengths L.

In addition, angles in quantized ranges are all rounded off to angles representing their quantized volumes (representative angles). A center value (or a maximum value, a minimum value or a predetermined value) of a corresponding quantized range is set as the representative angle. In FIG. 16b, the representative angle of a quantized range represented by +3 is indicated by an arrow followed by a dotted line. In addition, the representative angle of each quantized range is represented by a quantized value (0, +1, −1, +2, −2, . . . ) from the deviation angle 0. Consequently, when a resampling is implemented using the resampling length and quantization unit shown in FIG. 16a, angles within the range of 180° are represented by nine quantized values of 0, +/−1, +/−2, +/−3, and +/−4, and when a resampling is implemented using the resampling length L and quantization unit shown in FIG. 16b, angles within the range of 180° are represented by seventeen quantized values of 0, +/−1, +/−2, +/−3, +/−4, +/−5, +/−6, +/−7 and +/−8.

Figures 18, 19:
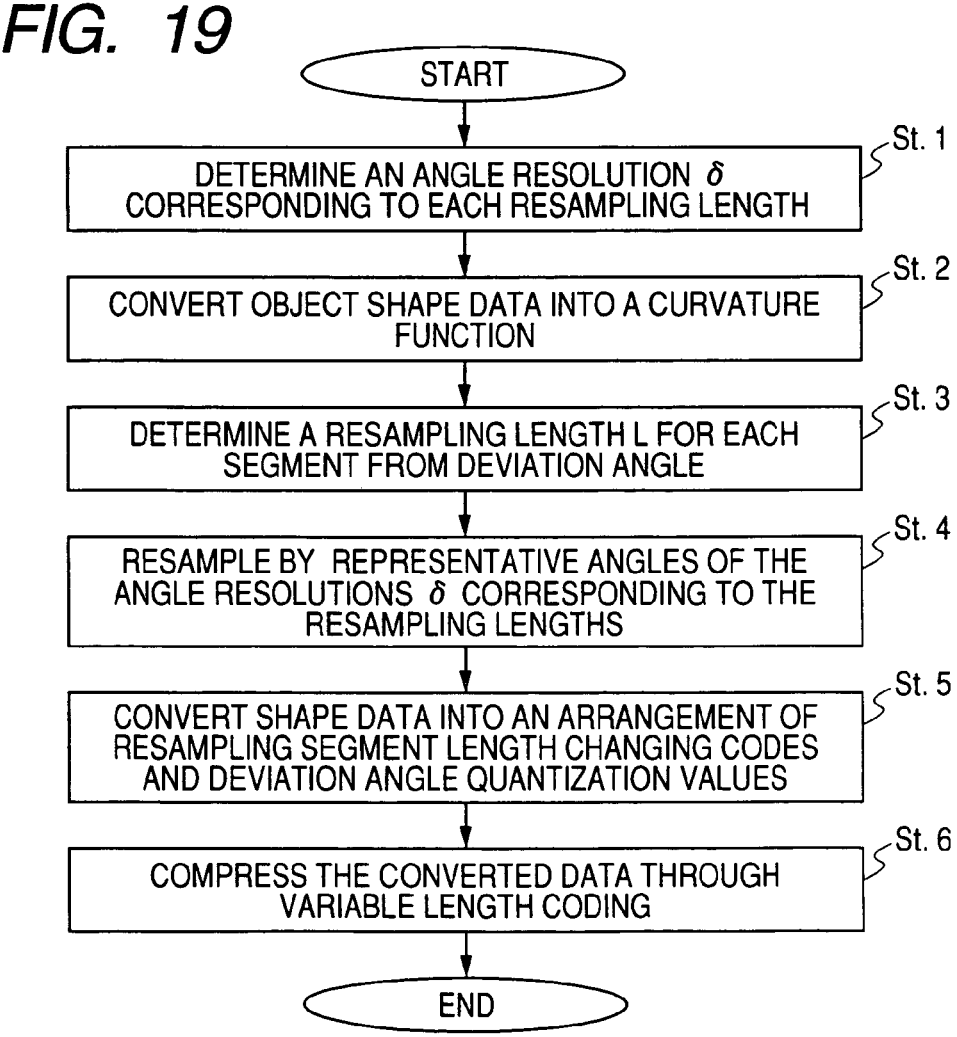
FIG. 18 is a drawing showing a definition table of angle resolutions used in the resampling method according to the seventh embodiment of the invention.
FIG. 19 is a flowchart showing the procedure of the resampling method according to the seventh embodiment of the invention.

FIG. 19 shows a resampling procedure on a transmitting side where the position information compressing method of this embodiment is implemented, and FIG. 17 illustrates the configuration of a traffic information providing system for providing traffic information by the method.

This system is made up of an information transmitting apparatus 20 for providing traffic information and an information utilizing apparatus 40 such as an on-board navigation system or a personal computer. The information transmitting apparatus includes an event information inputting unit 21 to which information on traffic jams or traffic accidents is inputted, a shape data extracting unit 23 for extracting shape data of an object road segment for traffic information from a digital map database A22, a permissible error determination unit 24 for determining a permissible error between a sampling point and a road position, a resampling length and angle resolution determination unit 25 for determining a resampling length L and an angle resolution δ based on the permissible error so determined, a shape data resample processing unit 26 for producing a data string of quantized positions of sampling points by resampling the shape data extracted at the shape data extracting unit 23, a variable length coding processing unit 28 for compression encoding the data produced by the shape data resample processing unit 26, a compressed data storing unit 27 for storing the compression encoded road shape data for provision to an external medium, and a shape data transmitting unit 29 for transmitting the compression encoded road shape data.

In contrast, the information utilizing apparatus 40 includes a shape data receiving unit 41 for receiving the road shape data so provided, an encoded data decoding unit 42 for decoding the compression encoded data, a shape data restoring unit 43 for restoring the position data of the sampling point, a map matching unit 45 for implementing a map matching using a digital map database B46 so as to identify the road segment represented by the sampling points on a digital map, and an information utilizing unit 44 for making use of traffic information so obtained.

In the information transmitting apparatus 20, as shown in a flowchart in FIG. 19, the resampling length and angle resolution determination unit 25 an angle resolution δ for each resampling length based on the permissible error determined at the permissible error determination unit 24 (Step 1). For example, as shown in FIG. 18, a definition table of angle resolutions depending on resampling lengths is set according to the determination. Data in this definition table may be predetermined in relation to the information utilizing apparatus 40 or may be transmitted to the information utilizing apparatus 40 when traffic information is provided.

Figure 21:
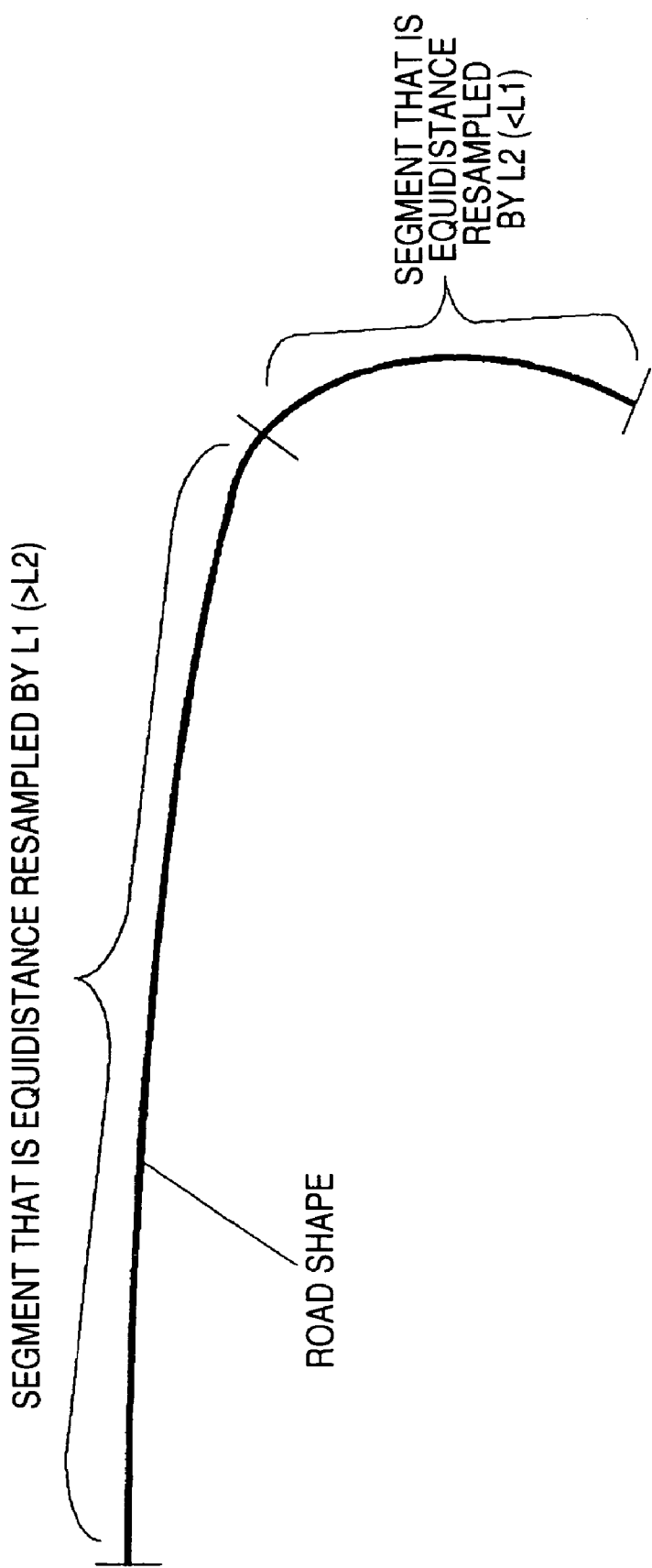
FIG. 21 is a drawing showing the shape of a road in which resampling lengths are changed over in the resampling method according to the seventh embodiment of the invention.

The shape data resample processing unit 26 converts the shape data of the object road extracted at the shape data extracting unit 23 into a curvature function (Step 2) and determines a resampling length L for each segment from a deviation angle (Step 3). Thus, as shown in FIG. 21, a resampling length L1 for equidistance resampling a segment whose road shape curvature is small (=the deviation angle is small) is determined depending on its corresponding deviation angle, and a resampling length L2 (<L1) for resampling a segment whose road shape curvature is large (=the deviation angle is large) is determined depending on its corresponding deviation angle.

The shape data resample processing unit 26, which has determined the resampling lengths L for the respective segments of the object road, reads out the angle resolutions δ in accordance with the resampling lengths L from the definition table (FIG. 18) and resamples the respective segments by the representative angles of the angle resolutions δ (Step 4).

Figure 22:
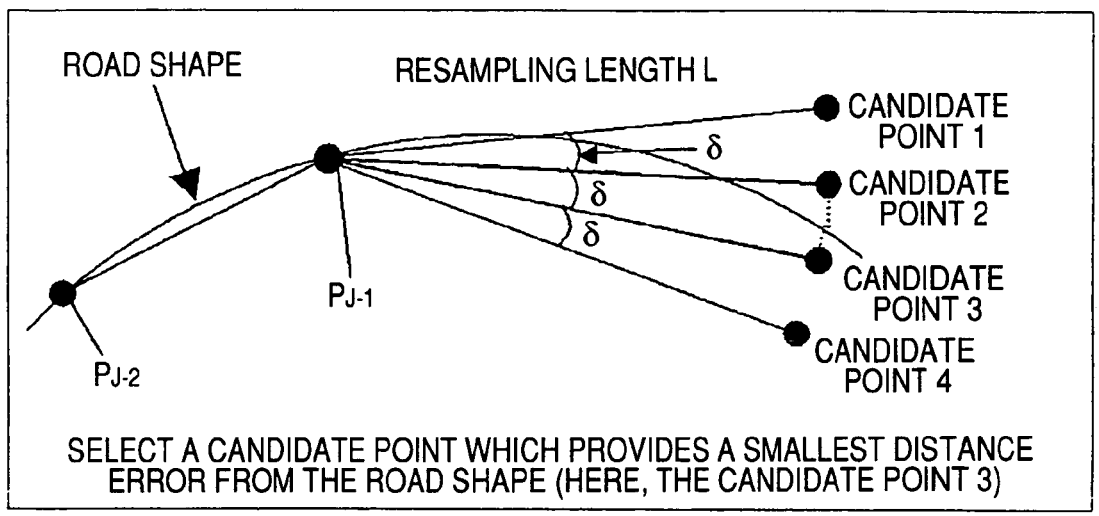
FIG. 22 is a drawing showing a procedure for setting resampling points in the seventh embodiment of the invention.

In resampling by the representative angles, as shown in FIG. 22, when resampling a sampling point PJ, points which are the resampling length L away from the previous sampling point PJ−1 on straight lines extending from the sampling point PJ−1 in directions of the representative angles of the respective quantized ranges are temporarily set as candidate points for the sampling point PJ, and among the candidate points the candidate point which is closest to the road shape is set as a sampling point PJ.

The shape data resampling processing unit 26 represents the deviation angles of the sampling points by quantized values so as to produce a data string in which a resampling segment length changing code which shows a changeover position of resampling lengths L and the length of the lengths L and quantized values (deviation angle quantized values) of the respective sampling points are arranged as the shape data of the object road (Step 5). The variable length coding processing unit 28 then variable length codes the shape data (Step 6).

By performing the resampling as has been described above, the information transmitting apparatus 20 can provide position information on the sampling points which can be transmitted in a small transmission volume and whose distance error from the object road is small.

Note that what is to be noted here resides in a point that the resampling is implemented by directly investigating the distance between the candidate points set on the representative angles of the resolution angles δ and the road shape. In case the sampling points are resampled on the road shape, the position information from the resampling is represented by minute angles (for example, in a unit of 1°) and then the angles are quantized by δ without adopting the method described above in Step 4, there occurs a phenomenon in which the resampling shape which links the resampling points largely deviates from the original road shape. For example, a resampling shape resulting after the sampling points are resampled in the unit of 1° and the angle data so obtained are then quantized by an angle resolution of 3° is superimposed on the map, there occurs a deviation in deviation angle in the quantization process at curves and corners, and thereafter, the deviation in orientation affects such that the deviation from the road shape is expanded.

On the other hand, no deviation from the road shape occurs in a resampling shape resulting when a resampling is implemented in an angle resolution unit of 3° using the method in Step 4 from the beginning. This is because, in the case of this method, even in case there occurs a deviation in deviation angle at some step in the quantization process, such an error is cancelled at the following resampling point, whereby no further effect by the deviation will continue.

Figure 23:
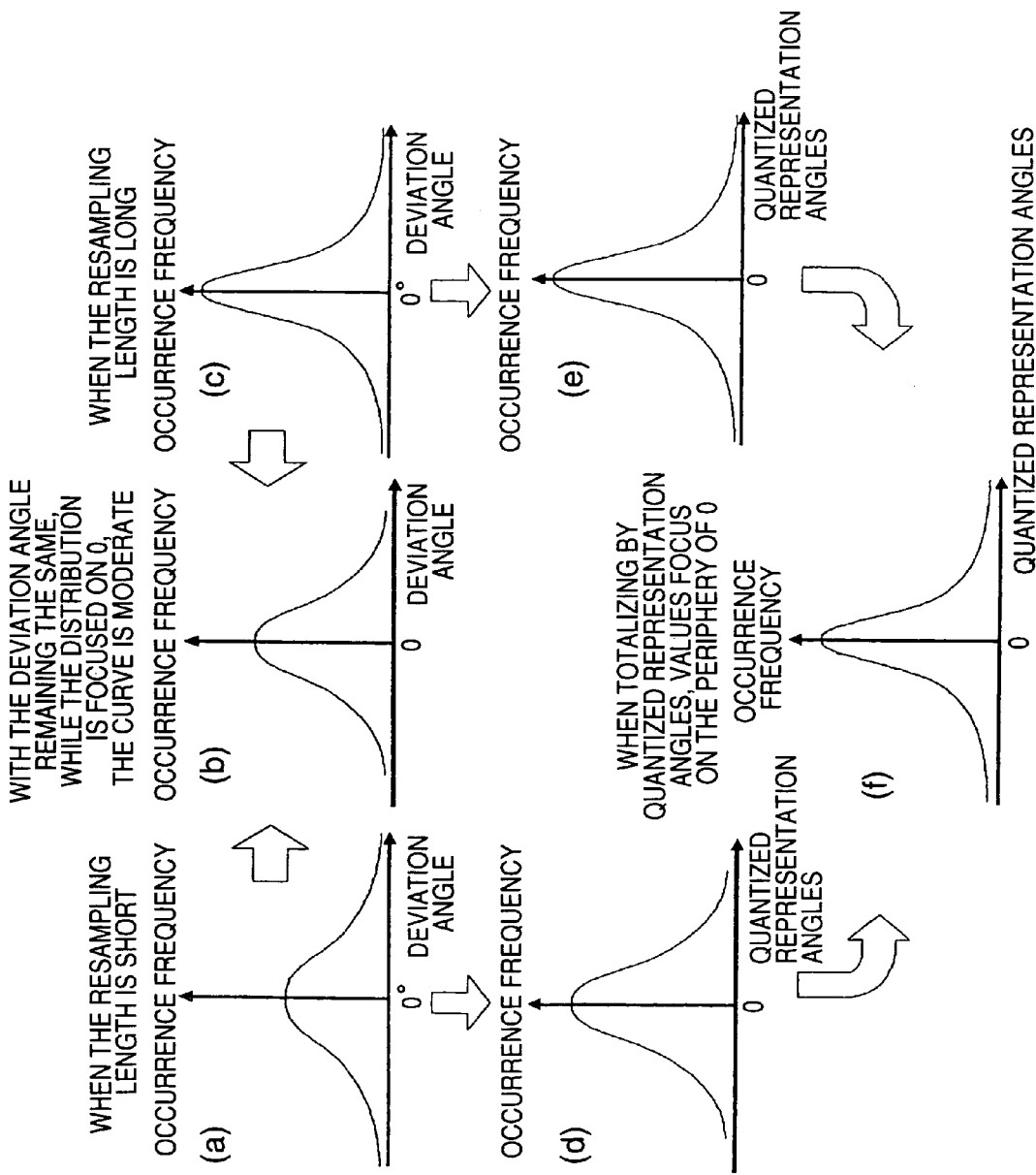
FIG. 23 is a drawing showing statistically biased data obtained by the resampling method according to the seventh embodiment of the invention.

In addition, in a case where a resampling method is adopted in which the quantization unit δ is changed over depending on resampling lengths L, the statistical bias of data to be variable length coded can be promoted, thereby making it possible to enhance the coefficient of data compression through encoding. This aspect will be described using FIG. 23.

In a case where the road shape is rectilinear and the resampling length is long, as shown in FIG. 23C, the share of data at the deviation angle 0° in the road shape data is extremely high. In a case where the road shape is curvilinear and the resampling length is short, however, the share of data at the deviation angle 0° in the road shape data is not that high, as shown in FIG. 23A. In a case where the road shape data are represented by the deviation angle, since there exist states shown in FIGS. 23A and 23C in a mixed fashion, the degree of focus of the road shape data on the deviation angle 0° is not that high as shown in FIG. 23B.

In contrast, when the road shape data are quantized for representation using the resampling methods of the invention, since the degree of focus of the road shape data on the quantization value 0 is increased, as shown in FIG. 23D, due to a large quantization unit δ being taken. In addition, in a case where the resampling length is long, since the degree of focus on the deviation angle 0° is originally high, the degree of focus on the quantization value 0 is not reduced, as shown in FIG. 23E, even in the event that the quantized representation is implemented. As a result, when the road shape data is quantized for representation, there is much data focusing on the periphery of the quantization value 0, as shown in FIG. 23F.

Due to this, the coefficient of data compression through variable length coding is increased.

Next, the fact that a resampling shape which provides a small distance error from the road shape can be obtained when the resampling method of the invention is used will be described by using the result of an actual resampling.

Figures 24A, 24B:
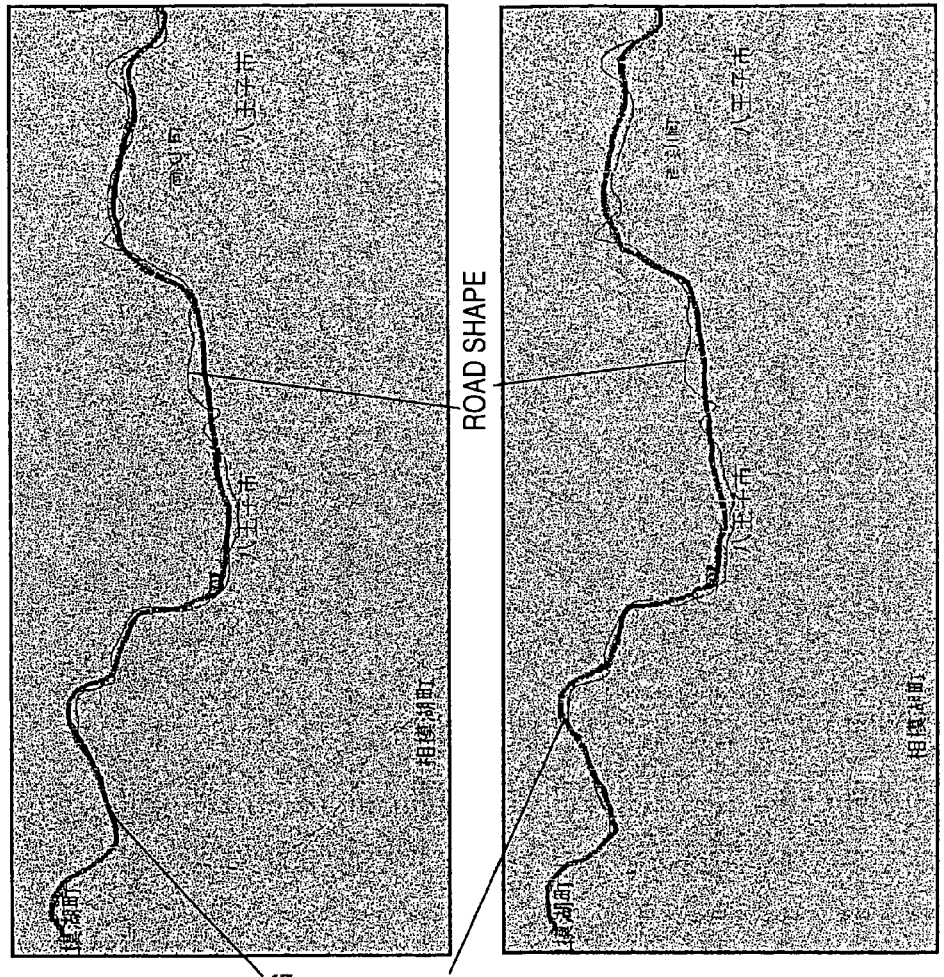
FIG. 24 shows changes in resampling shape when angle resolutions $\delta$ are changed with a short resampling length through a comparison using printouts of actual digital maps.

FIG. 24A illustrates a resampling shape resulting when a curved road in a mountainous area was resampled with δ=2° as being superimposed on a map. A resampling length L is set by;

$$L = Kr \cdot \rho$$

(where, ρ denotes the radius of curvature of the road shape, and Kr denotes a coefficient), resulting Kr=0.4. Since ρ is small on the road in the mountainous area, the resampling length L is short.

In addition, FIG. 24B illustrates a resampling shape resulting when the same road in the mountainous area is resampled by changing only δ to δ=6° with the other conditions remaining set the same as those in the case of FIG. 24A.

In either of FIGS. 24A and 24B, the distance error between the resampling shape and the road shape is small. As a result, it is clear from this that in the event that the resampling length is long, even in case δ is set large, a resampling shape having a small distance error can be obtained.

In addition, FIG. 25A illustrates a resampling shape resulting when a highway which curves moderately is resampled under the same conditions as those in the case of FIG. 24A. With this road, since ρ is large, the resampling length L is long. Note that the scale of the map is the same as that of one shown in FIG. 24A.

In addition, FIG. 25B illustrates a resampling shape resulting when the same highway is resampled by changing only δ to δ=6° with the other conditions remaining set the same as those in the case of FIG. 25A.

In FIG. 25A, the distance error between the resampling shape and the road shape is small. In FIG. 25B, however, this distance error is large. As a result, it is clear from this that when the resampling length L is long, in order to reduce the distance error between the resampling shape and the road shape, the angle resolution δ needs to be set small.

In addition, FIG. 26 shows data sizes resulting when the data of the resampling shapes shown in FIGS. 24A, 24B, 25A and 25B, respectively, are compression encoded.

It is clear from these that in the event that the resampling length L is short, by setting the angle resolution δ large, the data volume can be reduced while maintaining the distance error between the resampling shape and the road shape small, whereas in the event that the resampling length L is long, by setting the angle resolution δ small, the distance error can be reduced while suppressing the increase in data volume.

Note that while, here, the example has been illustrated in which the information utilizing apparatus 40, which has received the road shape data regarding the traffic information on the object road, implements a map matching so as to identify the object road on the digital map, in the event that the information transmitting apparatus 20 transmits the shape data of the resampling shape having the small error from the road shape as shown in FIGS. 8B, 24B and 25A, a map matching is not necessarily required on the receiving side.

In addition, while, here, the case has been described in which the road shape on the digital map is transmitted, the position information compressing methods of the invention can be applied not only to the transmission of the position information of roads but also to the transmission of position information on various types of linear patterns on the digital map such as rivers and railways, administrative boundaries and contours.

Eighth Embodiment

In an eighth embodiment according to the invention, a method will be described which relaxes a zigzag phenomenon appearing in a resampling shape of a rectilinear road/

FIG. 27A illustrates that a resampling shape (a solid line) deviates from a road at a bent location of the shape of the road (a dotted line) and thereafter traces the road shape in a zigzag fashion. This zigzag phenomenon naturally occurs because available angles are limited when tracing the road shape with an angle resolution δ being set. In addition, the frequency at which this phenomenon occurs is increased since available angles are limited further as the value of δ becomes larger, and the maximum value of a distance error from the road shape becomes large. Due to this, in urban areas such as Tokyo and Kyoto where roads are densely built in a lattice fashion, there is emerging a possibility that a matching is implemented on an adjacent road. In addition, in case there is generated this phenomenon, the coefficient of data compression is reduced even on the rectilinear road.

Figures 28, 29:
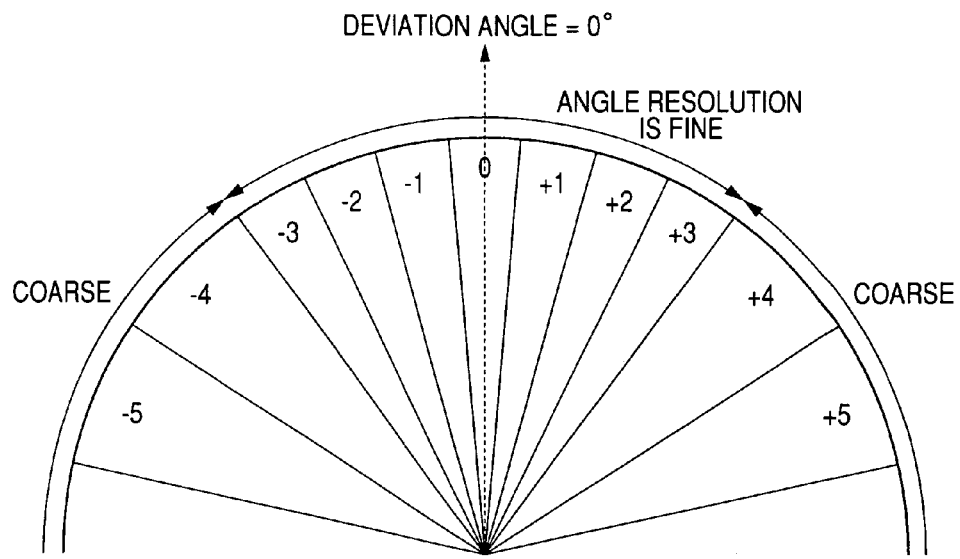
FIG. 28 is a drawing showing a relationship between a resampling length and an angle resolution which are used in the resampling method according to the eighth embodiment of the invention.
FIG. 29 is a definition table of angle resolutions used in the resampling method according to the eighth embodiment of the invention.

In order to relax the zigzag phenomenon, as shown in FIG. 28, the value of the angle resolution δ is set small in the vicinity of the deviation angle 0, whereas the value δ is set large where the deviation angle is large. With these settings, as shown in FIG. 27B, while the zigzag phenomenon occurs since the angle resolution δ is large at the bent location of the road shape where the deviation angle is increased, the frequency at which the zigzag phenomenon occurs is reduced since the angle resolution δ is small at a rectilinear part of the road shape where the deviation angle approximates to 0, whereby the occurrence of a zigzag phenomenon is suppressed, or even in case a zigzag phenomenon occurs, the error from the road shape is reduced.

Due to this, while the distance error is momentarily increased before and after a curve along the road, the road shape can be traced accurately along a rectilinear part of the road which follows the curve thereof, thereby making it possible to increase the quality of the whole resampling shape.

Note that the deviation angle range where the angle resolution δ is set minutely is determined appropriately in consideration of the shape of an object road.

FIG. 29 illustrates an example of definition table in which angle resolutions δ are defined depending on resampling lengths L and deviation angle ranges. Data on this definition table may be agreed in advance between a transmitting side (encoder) for transmitting encoded road shape data and a receiving side (decoder) for decoding the encoded road shape data so transmitted or may be transmitted as data from the encoder to the decoder.

In addition, the definition of angle resolution may be represented by an equation, and parameters thereof may be agreed in advance between the encoder and the decoder.

Alternatively, the definition equation of angle resolution may be agreed in advance between the encoder and the decoder and only the parameters thereof may be transmitted from the encoder to the decoder.

For example, with a standard resampling length (Lo) and an angle resolution which corresponds to a standard deviation angle being regarded as $\delta o°$, an angle resolution $\delta$ when the resampling length is L is defined as follows:
When $|\theta|\leq 10$, $$\delta=\text{Min }(\text{Round}(1.0\times\delta o\times(Lo/L)), \delta 1)$$

(Note that Round means that a fraction is rounded by counting fractions of 5 and over as a unit and disregarding the rest. $\delta$ is either a value resulting when $(1.0\times\delta o\times(Lo/L)$ is rounded by counting fractions of 5 and over as a unit and disregarding the rest or $\delta 1$, which is smaller)
When $10<|\theta|\leq 30$, $$\delta=\text{Min }(\text{Round}(1.3\times\delta o\times(Lo/L)), \delta 2)$$

When $30<|\theta|$, $$\delta=\text{Min }(\text{Round}(2.5\times\delta o\times(Lo/L)), \delta 3)$$

Then, values of Lo, $\delta o$, $\delta 1$, $\delta 2$, $\delta 3$ are transmitted from the encoder to the decoder.

According to this definition equation, $\delta$ does not exceed $\delta 1$, when $|\theta|\leq 10$, does not exceed $\delta 2$, when $10<|\theta|\leq 30$, and does not exceed $\delta 3$, when $30<|\theta|$. Namely, the values of $\delta 1$, $\delta 2$ and $\delta 3$ indicate a maximum value of the angle resolution $\delta$ for each deviation angle range.

Figure 30:
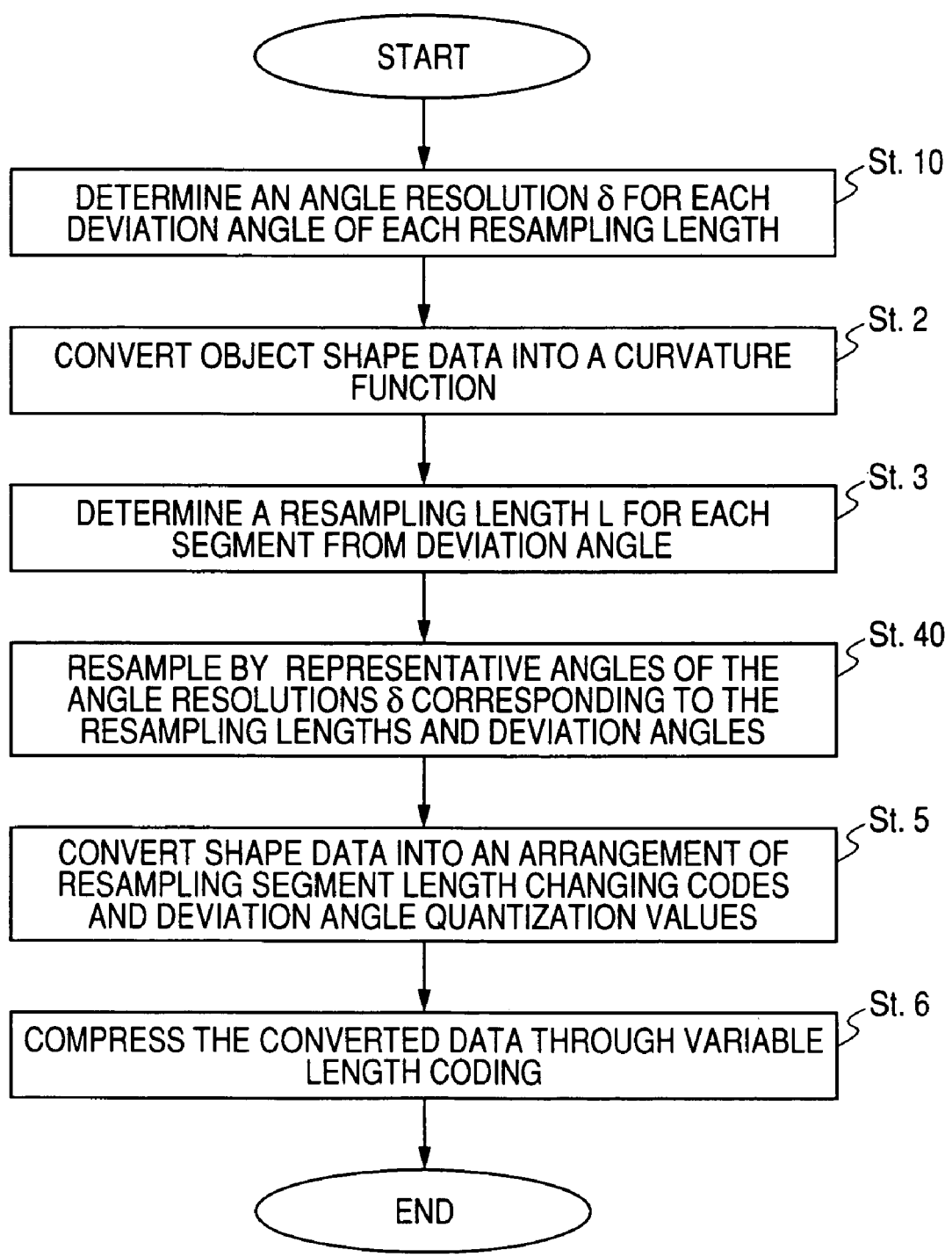
FIG. 30 is a flowchart showing the procedure of the resampling method according to the eighth embodiment of the invention.

A flowchart shown in FIG. 30 illustrates the procedure of a resampling in this case.

An angle resolution $\delta$ for each deviation angle of each resampling length is determined (Step 1), shape data of an object road are converted into a curvature function (Step 2), and a resampling length L for each segment is determined from the deviation angle (Step 3). Next, each segment is resampled by the representative angle of the angle resolution $\delta$ according to the resampling length L and deviation angle (Step 40). Processes thereafter remain the same as those in Steps 5 and 6 in FIG. 19.

Thus, the magnitude of the angle resolution is changed according to the magnitude of the absolute value of the deviation angle, and by setting small the angle resolution when the absolute value of the deviation angle is small, the zigzag phenomenon can be suppressed.

Ninth Embodiment

In a ninth embodiment according to the invention, a resampling process will be described in which an angle resolution $\delta$ is determined based on a permissible error that has been given in advance.

In a case where a permissible error Eo between the shape of a road and a resampling shape has been given in advance, $$\delta\leq 2\cdot\sin^{-1}(Eo/L)$$

needs to be satisfied from an equation

Maximum value of $Ea=L\times|\sin(\delta/2)|$

Due to this, a maximum value $\delta a$ of $\delta$ is determined, and $\delta$ is determined from the following equation (5).

$$\delta=\text{Min}(\text{Round}(2\cdot\sin^{-1}(Eo/L)), \delta 2) \quad (5)$$

Here, since the maximum value $\delta a$ is set, even in the event that the resampling length is short and does not reach Eo, an appropriate angle resolution can be set.

Figure 31:
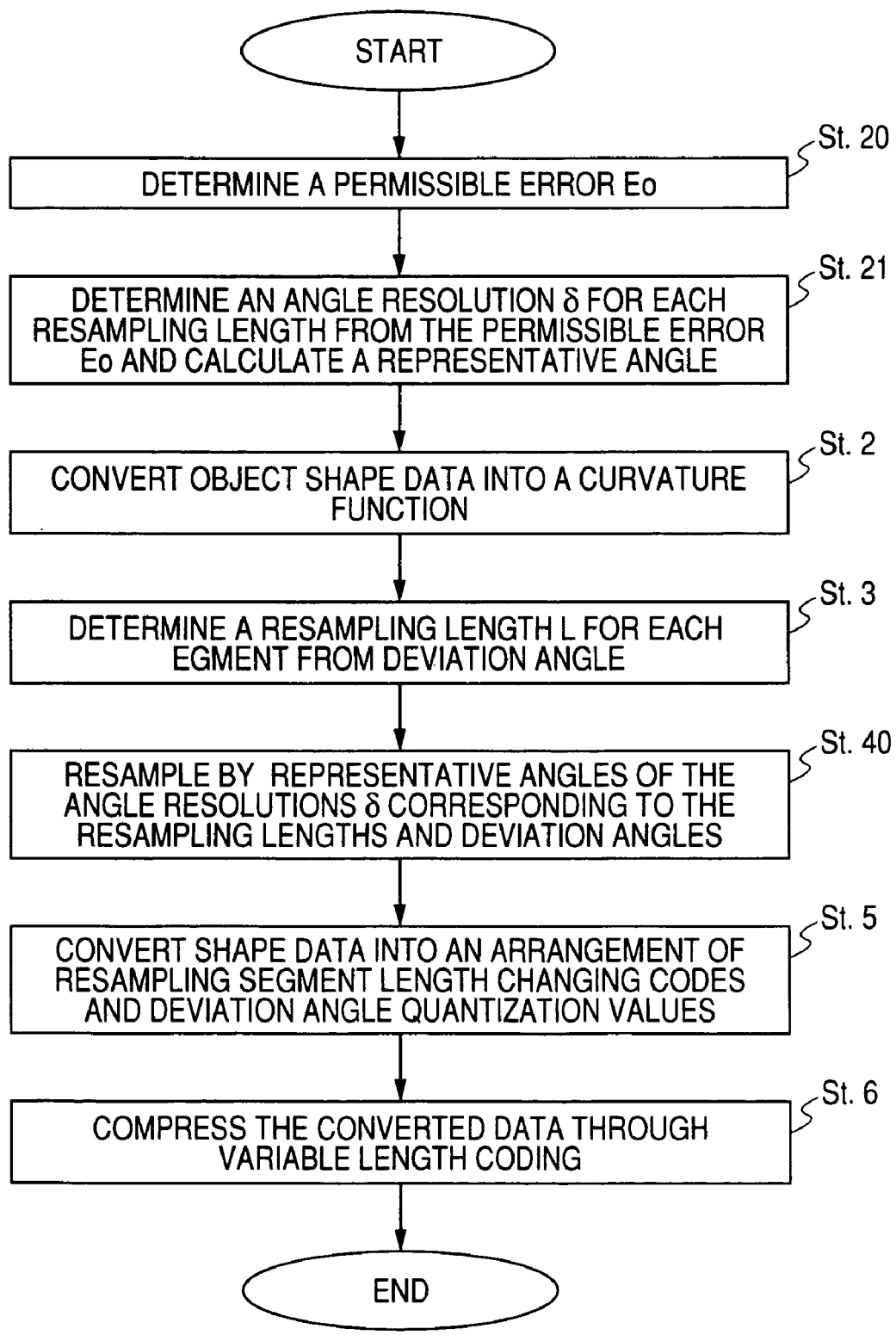
FIG. 31 is a flowchart showing the procedure of a resampling method according to a ninth embodiment of the invention.

FIG. 31 illustrates the procedure of a resampling process in this case. A permissible error Eo is determined (Step 20), an angle resolution $\delta$ for each resampling length is determined by the equation (5), and a representative angle is calculated (Step 21). The procedure thereafter remains the same as Steps 2 to 6 in FIG. 30.

Tenth Embodiment

In a tenth embodiment according to the invention, a resampling process will be described in which a resampling length is limited based on a permissible value that has been given in advance.

In a case where a permissible error Eo between the shape of a road and a resampling shape is given in advance, from an equation:

Maximum value of $Ea=L\times|\sin(\delta/2)|$

L needs to satisfy a relationship expressed by the following equation (6).

In a case where the relationship between L and $\delta$ is regulated by the definition tables shown in FIGS. 18 and 29, a resampling process is implemented using only resampling lengths L which satisfy the conditions of the equation (6).

Figure 32:
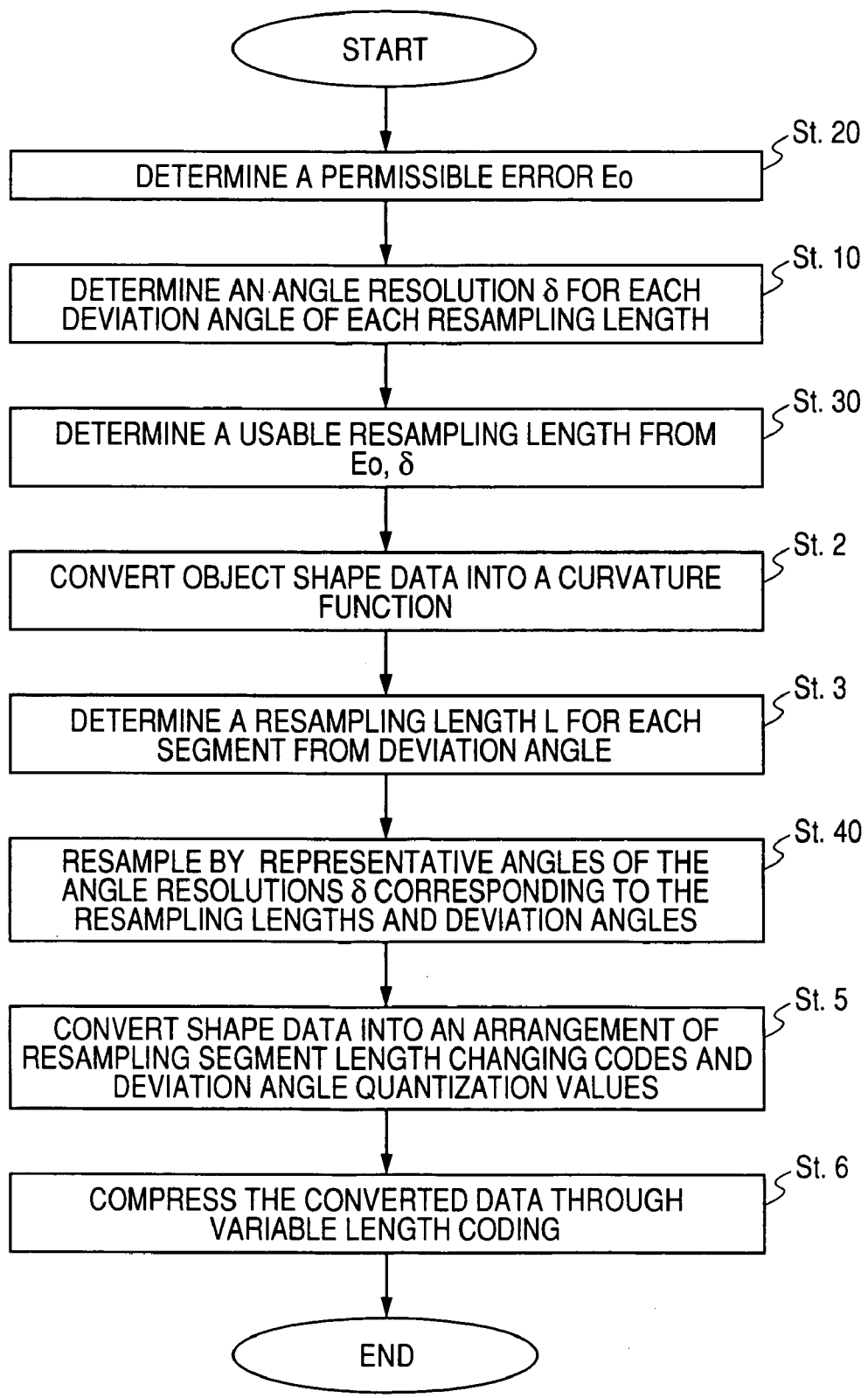
FIG. 32 is a flowchart showing the procedure of a resampling method according to a tenth embodiment of the invention.

FIG. 32 illustrates the procedure of a resampling process in this case. A permissible error Eo is determined (Step 20), an angle resolution $\delta$ for each deviation angle of each resampling length is determined (Step 10), and a usable resampling length is determined from Eo and $\delta$ which is regulated on the definition tables by the equation (6) (Step 30). The procedure thereafter remains the same as Steps 2 to 6 in FIG. 30.

Eleventh Embodiment

In an eleventh embodiment according to the invention, a probe information collecting system will be described which collects compressed data using the position information compressing methods of the invention.

Figure 33:
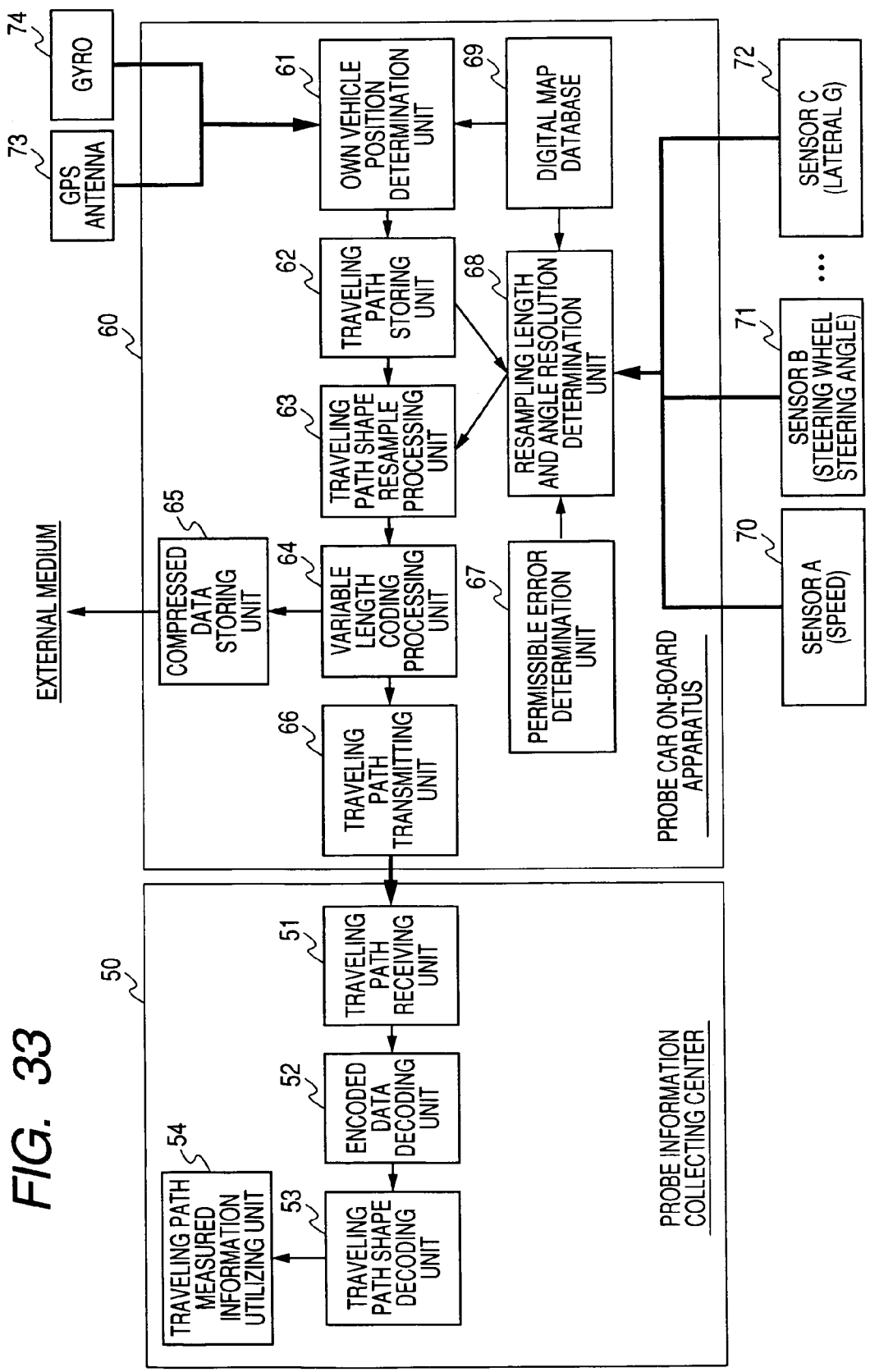
FIG. 33 is a block diagram showing the configuration of a probe information collecting system according to an eleventh embodiment of the invention.
Figure 34A:
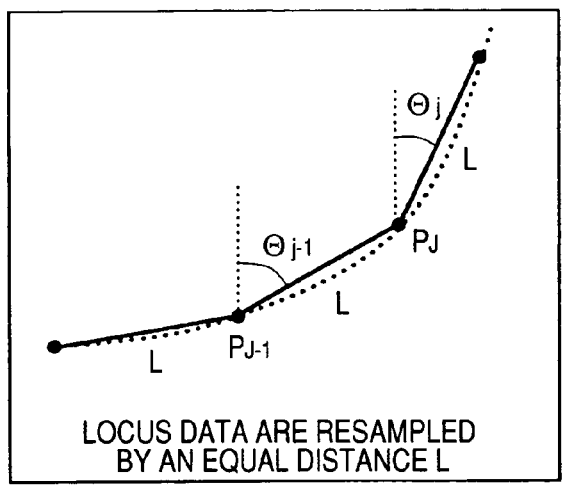
FIG. 34 is a drawing explaining a method for representing sampling points by angular components.
Figure 34B:
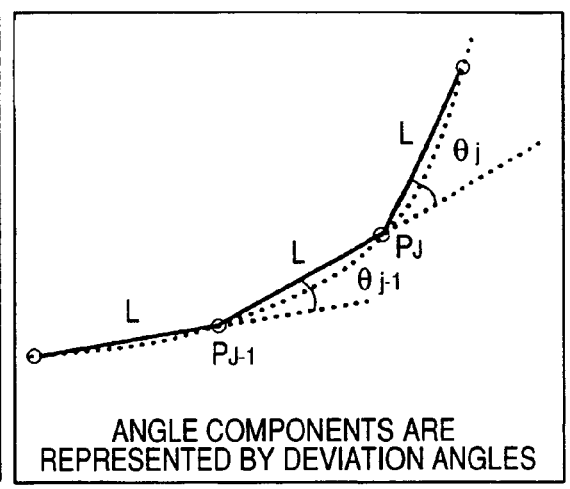
Figure 34C:
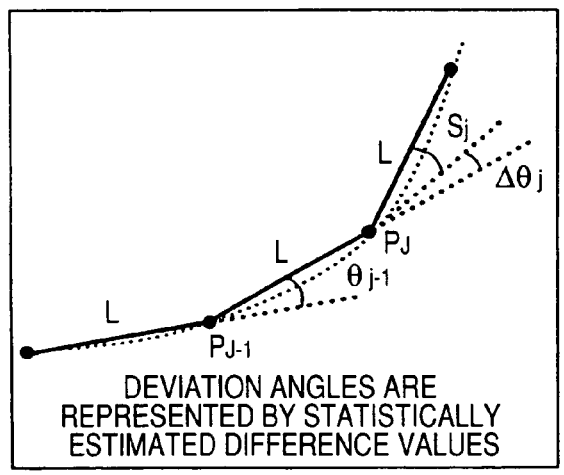
Figure 34D:
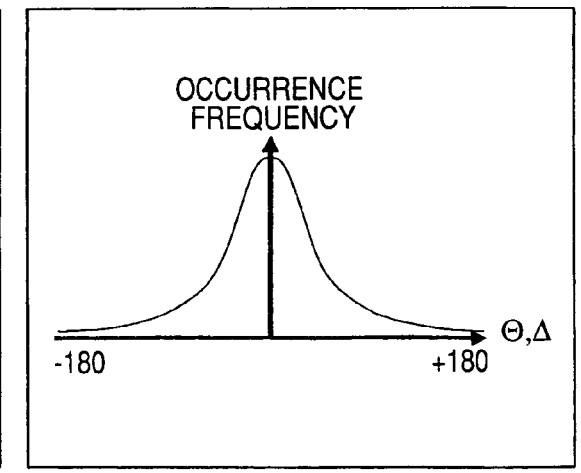
Figure 36:
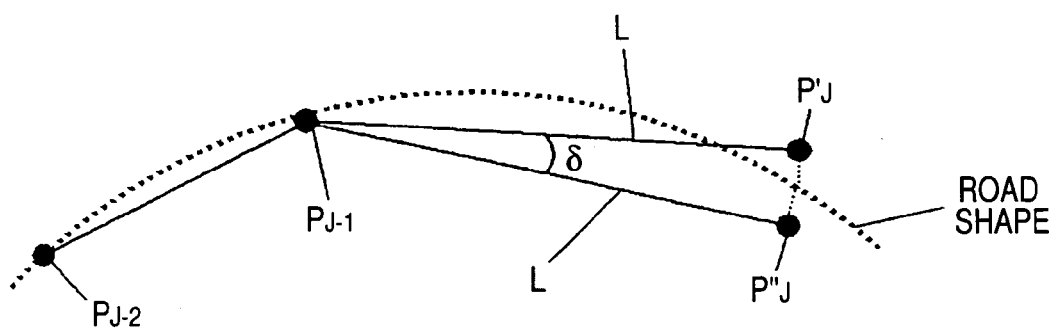
FIG. 36 is a drawing explaining the magnitude of a distance error between a sampling point and the shape of a road.
Figure 37:
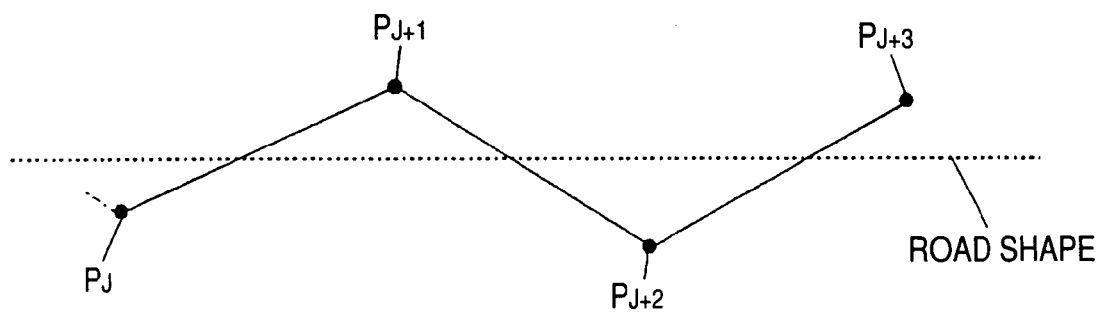
FIG. 37 is a drawing explaining a zigzag condition of a resampling shape.

This system is, as shown in FIG. 33, made up of a probe car on-board apparatus 60 for providing probe information and a probe information collecting center 50 for collecting probe information. The probe car on-board apparatus 60 includes an own vehicle position determination unit 61 for determining the position of an own vehicle based on information received from a GPS antenna 73 and information detected by a gyro 74, a sensor 70 for detecting speeds, a sensor 71 for detecting a steering wheel steering angle, a sensor 72 for detecting a lateral acceleration (lateral G), a digital map database 69, a permissible error determination 67 for determining a permissible error between a resampling shape and the position of a road, a resampling length and angle resolution detection unit 68 for determining a resampling length L for use in resampling and an angle resolution $\delta$, a traveling path storing unit 62 for storing a traveling path of the own vehicle, a traveling path shape resample processing unit 63 for resampling a traveling path so as to produce data of a resampling shape, a variable length coding processing unit 64 for compression encoding the data produced by the traveling path shape resample processing unit 63, a compressed data storing unit 65 for storing compression encoded traveling path shape and a traveling path transmitting unit 66 for transmitting compression encoded traveling path shape data.

On the other hand, the probe information collecting sensor 50 includes a traveling path receiving unit 51 for receiving the traveling path shape data provided from the probe car on-board apparatus 60, an encoded data decoding unit 52 for decoding the compression encoded data so received, a traveling path shape restoring unit 53 for restoring a traveling path shape from the decoded data and a traveling path and measured information utilizing unit 54 for making use of the traveling path collected from the probe car on-board apparatus 60 and measured information for production of traffic information.

Positions of the own vehicle detected by the own vehicle position determination unit 61 are sequentially stored in the traveling path storing unit 62 of the probe car on-board apparatus 60. The resampling length and angle resolution determination unit 68 determines the magnitude of the curvature of the traveling path from the information on speed, steering wheel steering angle and lateral G which are detected by the sensors 70, 71, 72, respectively, and road shapes obtained from the digital map database 69 and determines a resampling length for use in resampling and an angle resolution δ based on the magnitude of the curvature so determined and the permissible error determined at the permissible error determination unit 67.

The traveling path shape resample processing unit 63 reads out, when transmitting probe information, the traveling path data stored in the traveling path storing unit 62, resamples the traveling path shape using the resampling length and the angle resolution δ which were determined at the resampling length and angle resolution determination unit 68 and produces a data string in which deviation angle quantized values are arranged.

The variable length coding processing unit 64 variable length coding the data for compression. The compression encoded data are transmitted to the probe information collecting center 50. In addition, there may be a case where the data are stored in an external medium for provision to the probe information collecting center 50.

The probe information collecting center 50 decodes the data collected from the probe car on-board apparatus 60, thereafter, restores the traveling path shape and makes use of the traveling path shape so restored together with measured information such as speeds measured by the probe car on-board apparatus 60 for production of traffic information.

The resampling length and angle resolution determination unit 68 and the traveling path shape resample processing unit 63 of the probe car on-board apparatus 60 determines a resampling length and angle resolution δ using the resampling methods described in the seventh to tenth embodiments and executes the resampling of the traveling path.

Due to this, the probe car on-board apparatus 60 can transmit traveling path accurately in a small volume of data.

Note that the position information compressing methods of the invention can be applied to the compression of not only roads but also other map data of digital maps.

Thus, while, in the first and eleventh embodiments, the example is described where the map matching is executed using the shape vectors, the position identifying process may not have to be limited to the map matching. In addition, while the invention has been described as being applied to the compression of position information regarding linear shapes such as an object road and a traveling path, the invention can by applied to the compression of position information regarding buildings and certain areas. For example, sampling points may be set along the periphery of a building or the boundary line of an area, so that the position may be represented by the angles of the respective sampling points.

In addition, the contents of this patent application are effective for map data themselves which are installed in a car navigation system or transmitted by a communication means.

Thus, while the invention has been described in detail and by reference to the specific embodiments, it is obvious to those skilled in the art that various changes and modification may be made thereto without departing from the spirit and scope of the invention. The invention is based on the Japanese Patent Application (No. 2003-166503) filed on Jun., 11, 2003 and the Japanese Patent Application (No. 2003-167780) filed on Jun. 12, 2003, and the contents thereof are incorporated herein by reference.

INDUSTRIAL APPLICABILITY

As is clear from the description that has been made heretofore, in the vector data compressing method according to the invention, data can be produced which can transmit a shape which approximates to an original shape most truly in a small volume of data, and the original shape can be reproduced on a receiving side which received the data.

In addition, the apparatus according to the invention can implement the vector data compressing method.

Furthermore, in the position information compressing method according to the invention, position information of linear shapes such as roads on the digital map can be converted into compressed data which can reproduce the original shape accurately in a small volume of data.

Due to this, the transmission cost and transmission load of data can be reduced, and in a case where data is transmitted while being stored in a storage medium, the storage efficiency of the storage medium can be enhanced. In addition, since the error from the original linear shape is small, the position of the linear shape on the digital map can easily be identified from the transmitted information, and in a case where the position of the linear shape is identified by implementing a map matching, the occurrence of an erroneous matching can be avoided.

In addition, the apparatus according to the invention can produce for transmission compressed data in a small data volume by implementing the position information compressing method of the invention.

The invention claimed is:

1. A method of compressing shape data which indicate position information on a digital map and which have a shape represented by a coordinate point series, the method comprising the steps of:

sampling a vector shape by a constant sampling length in such a manner that a distance error between a straight line which links between sampling points and the vector shape does not deviate to either the left or the right of the straight line in a longitudinal direction thereof so as to set a sampling point;

representing the vector shape by a data string of angle information indicating the position of the sampling point; and variable length coding data of the data string.

2. The method of compressing shape data according to claim 1, wherein:

when setting the sampling point, the sampling point is set in consideration of a difference between an area located between the straight line and the vector shape on the right side of the straight line and an area located between the straight line and the vector shape on the left side of the straight line.

3. The method of compressing shape data according to claim 1, wherein:
when setting the sampling point, the sampling point is set in consideration of a difference between the length of a line segment of the vector shape located on the right side of the straight line and the length of a line segment of the vector shape located on the left side of the straight line.

4. The method of compressing shape data according to claim 1, wherein:
when setting the sampling point, the sampling point is set in consideration of a difference between a maximum distance error between the straight line and the vector shape on the right side of the straight line and a maximum distance error between the straight line and the vector shape on the left side of the straight line.

5. The method of compressing shape data according to claim 1, wherein:
when setting the sampling point, the sampling point is set in consideration of a larger maximum distance error out of a maximum distance error between the straight line and the vector shape on the right side of the straight line and a maximum distance error between the straight line and the vector shape on the left side of the straight line.

6. The method of compressing shape data according to claim 1, wherein:
when setting the sampling point, the sampling point is set in consideration of a deflection angle absolute value of the straight line.

7. A receiver that receives data which is compressed by a method according to claim 1.

8. An information providing apparatus for providing data containing position information on a digital map, the apparatus comprising:
shape data extracting means for extracting shape data of an object road from a digital map database;
shape data sample processing means for sampling the shape data by a constant sampling length in such a manner that a distance error between a straight line which links between sampling points and the shape data does not deviate to either the left or the right of the straight line so as to set a sampling point and representing the object road by a data string of quantized angle information which indicates the position of the sampling point;
variable length coding means for variable length coding data of the data string; and
providing means for providing means for providing data coded by the variable length coding means.

9. A probe car on-board apparatus for providing information on a traveling path, the apparatus comprising:
own vehicle position detecting means for detecting a position of an own vehicle;
storing means for storing sequentially the positions of the own vehicle detected by the own vehicle position detecting means as a traveling path;
shape data sample processing means for sampling the traveling path by a constant sampling length in such a manner that a distance error between a straight line which links between sampling points and the traveling path does not deviate to either the left or the right of the straight line so as to set a sampling point and representing the traveling path by a data string of quantized angle information which indicates the position of the sampling point;
variable length coding means for variable length coding data of the data string; and
transmitting means for transmitting data coded by the variable length coding means.

10. A method of compressing position information on a digital map, the method comprising the steps of:
changing an angle resolution which constitutes a quantization unit of an angle depending on a length of a sampling length;
dividing a linear shape contained in a digital map into one or a plurality of segments and sampling linear shapes in the segments by a constant sampling length;
representing the position of the linear shape by a data string of quantized angle information indicating the position of a sampling point; and
variable length coding data of the data string.

11. A compressing method as set forth in claim 10, wherein:
when setting the angle resolution, the magnitude of the angle resolution is set large when the sampling length is short.

12. The compressing method according to claim 10, wherein:
when setting the angle resolution, the sampling length or the angle resolution is set such that a distance error between the linear shape and a sampling shape does not exceed a permissible error that has been regulated in advance.

13. The compressing method according to claim 11, further comprising the step of:
setting an upper limit on the angle resolution.

14. The compressing method according to claim 10, wherein:
when setting the angle resolution, the magnitude of the angle resolution is changed according to the magnitude of an absolute value of a deflection angle, so that the angle resolution when the absolute value of the deflection angle is small is set small.

15. The compressing method according to claim 10, wherein:
when sampling the linear shape,
a plurality of candidate points are set at positions which are away by the sampling length from a adjacent sampling point in respective directions that the quantized angle can take; and
of the candidate points, the candidate point which approximates to the linear shape most truly is set as a sampling point.

16. The compressing method according to claim 12, further comprising the step of:
setting an upper limit on the angle resolution.

17. A receiver that receives data which is compressed by a method according to claim 10.

18. An information providing apparatus for providing position information on a digital map, the apparatus comprising:
angle resolution determination means for setting an angle resolution which constitutes a quantization unit of an angle according to a length of a sampling length;
shape data sampling processing means for dividing the road shape of an object road contained in a digital map into one or a plurality of segments, sampling shapes in the segments using a constant sampling length and an angle resolution set according to the length of the sampling length and producing a data string of quantized angle information indicating a position of a sampling point; and
variable length coding means for variable length coding data of the data string; and wherein, data coded by the variable length coding means are provided as position information of the object road.

19. A probe car on-board apparatus for providing information on a traveling path, the apparatus comprising:

own vehicle position determination means for detecting a position of an own vehicle;

storing means for storing a traveling path;

sampling length and angle resolution determination means for determining a sampling length based on the shape of the traveling path or information of a sensor installed in a vehicle and determining an angle resolution which constitutes a quantization unit of an angle according to the length of the sampling length;

traveling path sample processing means for sampling the traveling path using the sampling length and the angle resolution which are determined by the sampling length and angle resolution determination means and producing a data string of quantized angle information indicating the position of a sampling point; and a variable length coding means for variable length coding data of the data string, and wherein;

data coded by the variable length coding means are provided as information on the traveling path.

20. A computer readable recording medium storing a program for executing the compression of shape data indicating position information on a digital map, wherein:

a computer is made to execute;

sampling a vector shape by a constant sampling length in such a manner that a distance error between a straight line which links between sampling points and the vector shape does not deviate to either the left or the right of the straight line in a longitudinal direction thereof so as to set a sampling point;

representing the vector shape by a data string of angle information indicating the position of the sampling point; and variable length coding data of the data string.

21. A computer readable recording medium storing a program for executing the compression of position information on a digital map, wherein:

a computer is made to execute;

setting an angle resolution which constitutes a quantization unit of an angle according to a sampling length;

dividing a linear shape contained in a digital map into one or a plurality of segments and sampling linear shapes in the segments by a constant sampling length;

representing the position of the linear shape by a data string of quantized angle information indicating the position of a sampling point; and variable length coding data of the data string.

22. A method of compressing position information on a digital map, comprising the steps of:

sampling an object road segment by a constant sampling length in such a manner that a distance error between a straight line which links between sampling points in the object road segment and the object road segment does not deviate to either the left or the right of the straight line in a longitudinal direction thereof so as to set a sampling point;

representing the object road segment by a data string of angle information indicating the position of the sampling point; and variable length coding data of the data string.

23. A receiver that receives data which is compressed by a method according to claim 22.

24. A method for compressing position information on a digital map, comprising the steps of:

setting an angle resolution which constitutes a quantization unit of an angle according to the length of a sampling length;

dividing a road contained in a digital map into one or a plurality of segments and sampling the segments by a constant sampling length;

representing the position of the segments by a data string of quantized angle information indicating the position of a sampling point; and variable length coding data of the data string.

25. A receiver that receives data which is compressed by a method according to claim 24.

* * * * *